(12) United States Patent
Brown et al.

(10) Patent No.: US 10,698,685 B2
(45) Date of Patent: Jun. 30, 2020

(54) INSTRUCTIONS FOR DUAL DESTINATION TYPE CONVERSION, MIXED PRECISION ACCUMULATION, AND MIXED PRECISION ATOMIC MEMORY OPERATIONS

(71) Applicant: Intel Corporation, Santa Clara, CA (US)

(72) Inventors: William M. Brown, Beaverton, OR (US); Karthik Raman, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 202 days.

(21) Appl. No.: 15/586,032

(22) Filed: May 3, 2017

(65) Prior Publication Data

US 2018/0321937 A1 Nov. 8, 2018

(51) Int. Cl.
*G06F 9/38* (2018.01)
*G06F 9/30* (2018.01)

(52) U.S. Cl.
CPC ........ *G06F 9/30014* (2013.01); *G06F 9/3016* (2013.01); *G06F 9/30025* (2013.01); *G06F 9/30036* (2013.01); *G06F 9/3802* (2013.01); *G06F 9/3887* (2013.01)

(58) Field of Classification Search
CPC .................................................. G06F 9/30025
See application file for complete search history.

(56) References Cited

U.S. PATENT DOCUMENTS 5,515,520 A * 5/1996 Hatta ...................... G06F 7/483
708/550
2003/0074544 A1 * 4/2003 Wilson ................ G06F 9/30014
712/226
2005/0055535 A1 * 3/2005 Moyer ................ G06F 9/30043
712/4
2014/0019720 A1 * 1/2014 Sprangle ............. G06F 9/30025
712/206
2016/0224345 A1 * 8/2016 Moudgill ............ G06F 15/8076
2017/0024209 A1 * 1/2017 Mahurin ............... G06F 9/3001
2018/0157464 A1 * 6/2018 Lutz ........................ G06F 7/483

OTHER PUBLICATIONS

IEEE Computer Society, "IEEE Standard for Floating-Point Arithmetic," IEEE Std 754™—2008, Aug. 29, 2008, New York, 70 pages.

* cited by examiner

*Primary Examiner* — Jacob Petranek
(74) *Attorney, Agent, or Firm* — Nicholson De Vos Webster & Elliott, LLP

(57) ABSTRACT

Disclosed embodiments relate to instructions for dual-destination type conversion, accumulation, and atomic memory operations. In one example, a system includes a memory, a processor including: a fetch circuit to fetch the instruction from a code storage, the instruction including an opcode, a first destination identifier, and a source identifier to specify a source vector register, the source vector register including a plurality of single precision floating point data elements, a decode circuit to decode the fetched instruction, and an execution circuit to execute the decoded instruction to: convert the elements of the source vector register into double precision floating point values, store a first half of the double precision floating point values to a first location identified by the first destination identifier, and store a second half of the double precision floating point values to a second location.

15 Claims, 25 Drawing Sheets

Instruction 200

520

```
Pseudocode for dual-destination type conversion instruction.

mem2, mem3 = VCVTPS2PD2 zmm1 for i=8:15
        mem3[ i-8 ] = cast_ to_double( zmm1 [ i ])
endfor
for i=0:7
        mem2[ i ] = cast_ to_double ( zmm1[ i ])
endfor
```

550

Pseudocode for a mixed precision type conversion and accumulation instruction.

zmm2 = VADDPS2PD zmm1, zmm2 for i=0:7
    zmm2[ i ] += cast_to_double ( zmm1[ i ])
endfor for i=8:15
    zmm3[ i-8 ] += cast_to_double( zmm1 [ i ])
endfor

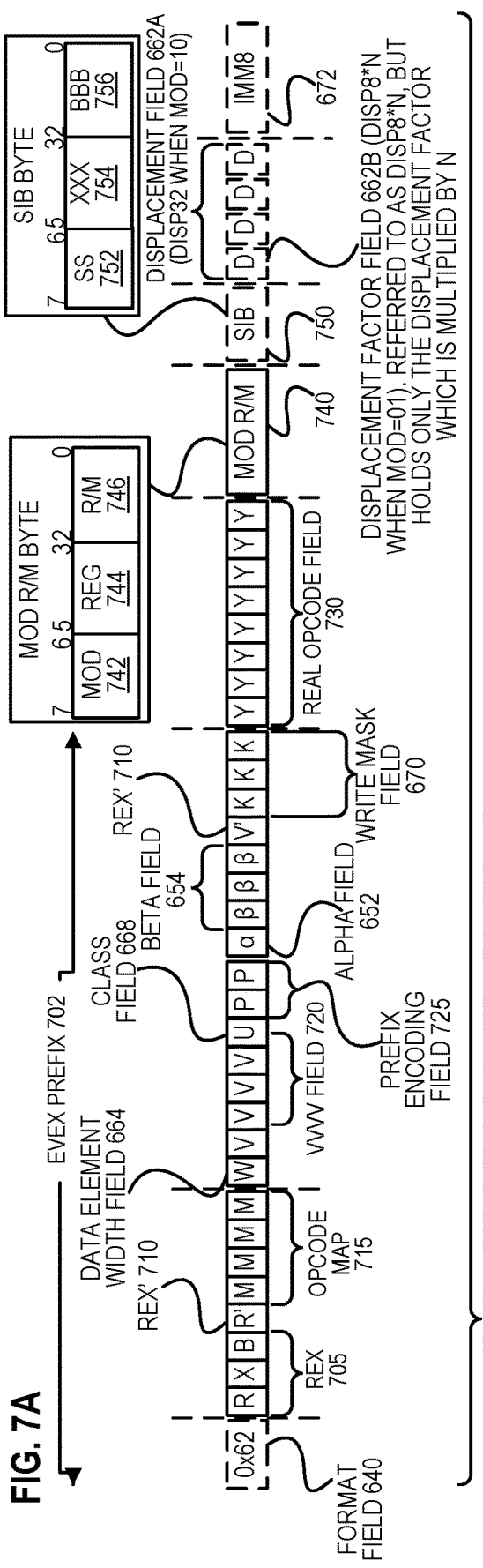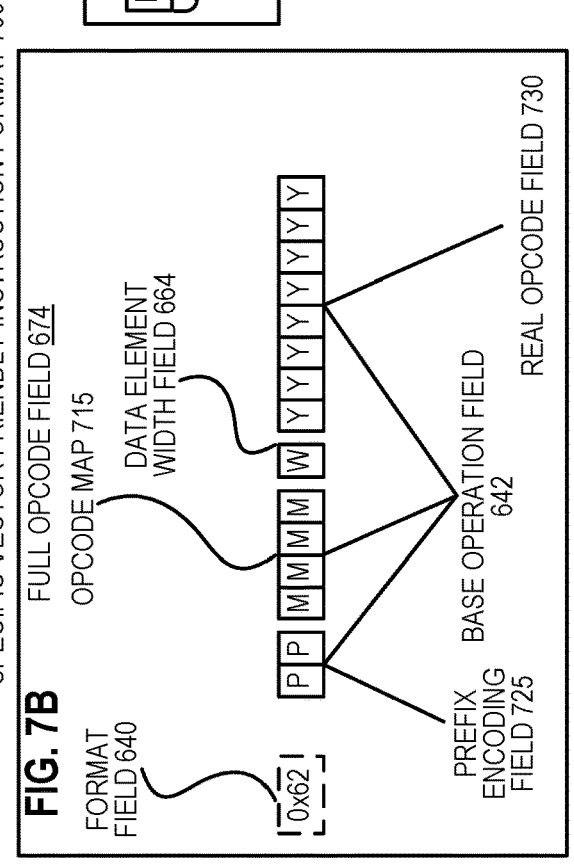

FIG. 8
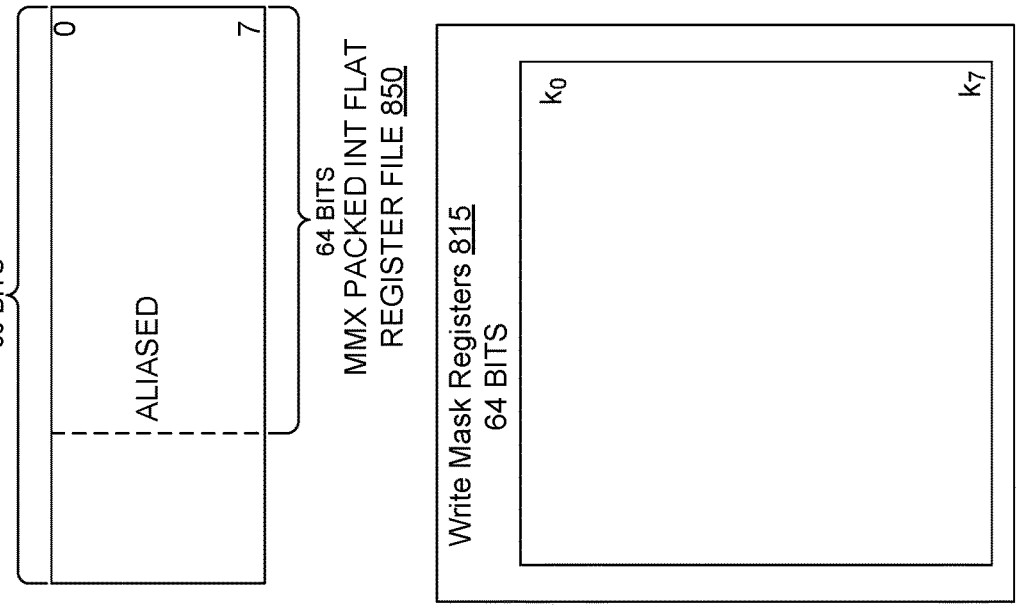
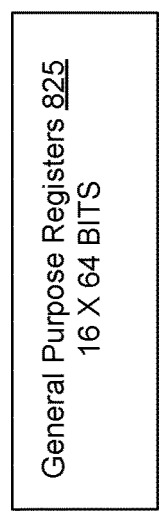

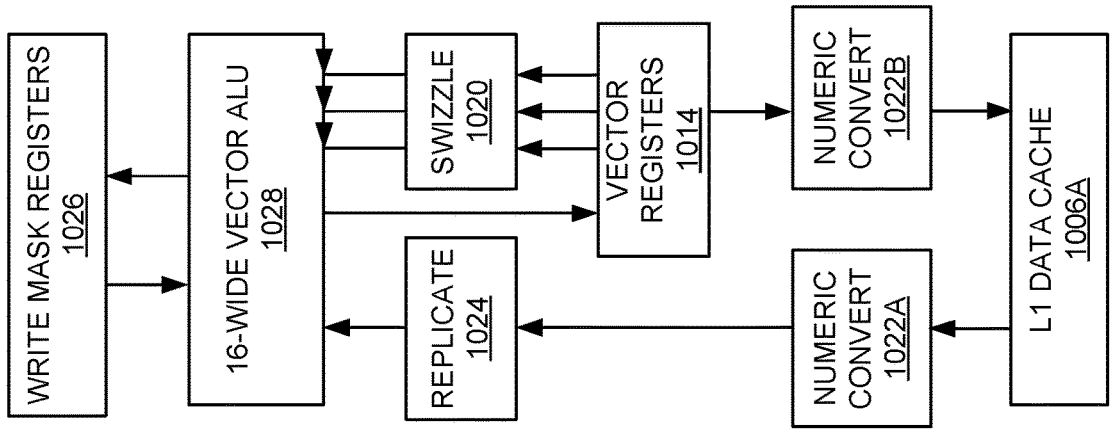
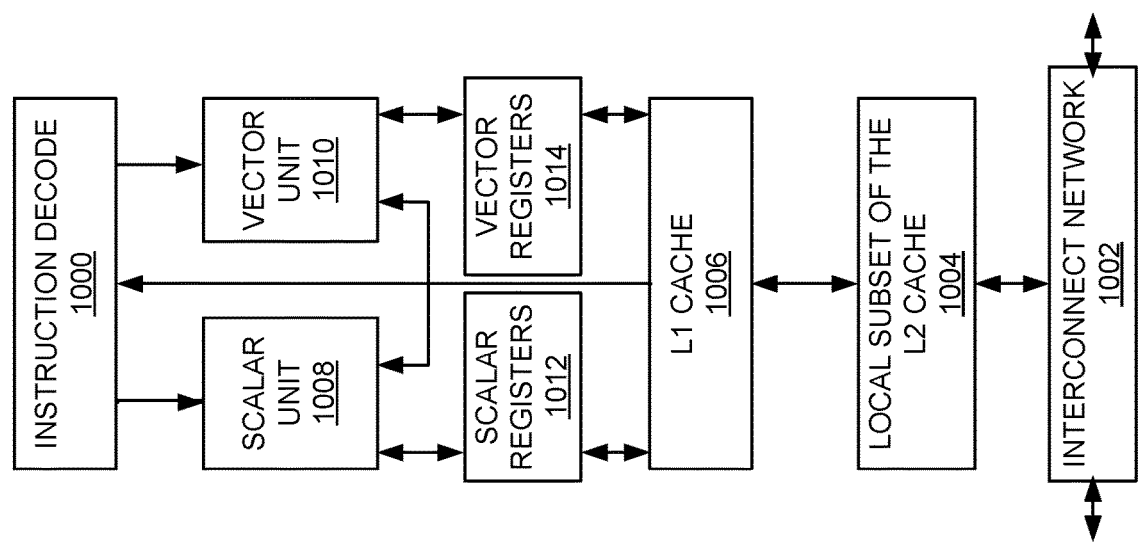

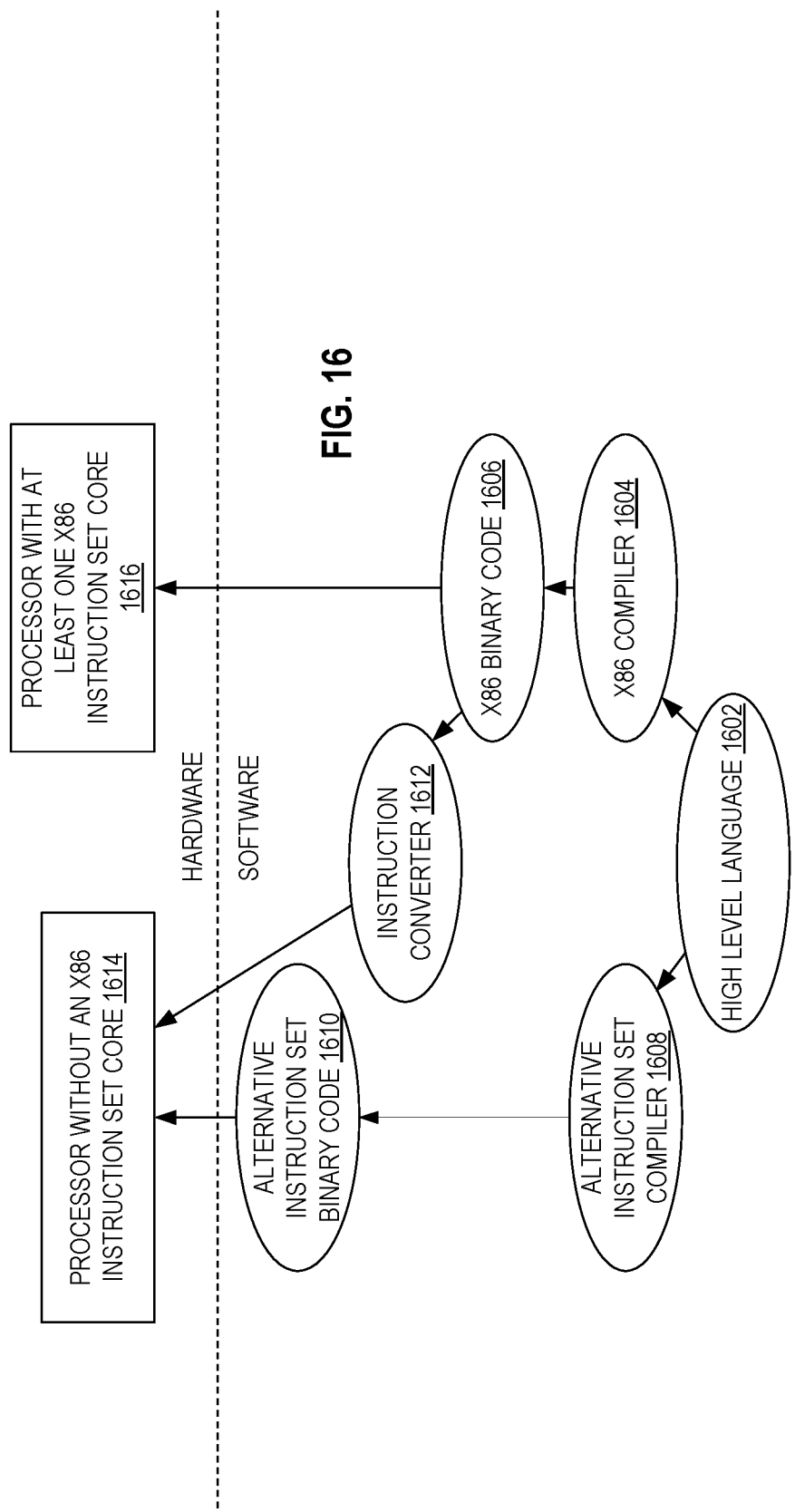

INSTRUCTIONS FOR DUAL DESTINATION TYPE CONVERSION, MIXED PRECISION ACCUMULATION, AND MIXED PRECISION ATOMIC MEMORY OPERATIONS

FIELD OF INVENTION

The field of invention relates generally to computer processor architecture, and, more specifically, to instructions for dual-destination type conversion, mixed-precision accumulation, and mixed-precision atomic memory operations.

BACKGROUND

Modern processors often include instructions to provide operations that are computationally intensive, but offer a high level of data parallelism that can be exploited through an efficient implementation using various data storage devices, such as for example, single instruction multiple data (SIMD) vector registers. The central processing unit (CPU) may then provide parallel hardware to support processing vectors. Vectorization thus can improve power-efficient performance of a processor.

The IEEE 754 Standard for Floating-Point Arithmetic (IEEE 754) is a technical standard for floating-point computation established in 1985 (an update of which was published in August, 2008) by the Institute of Electrical and Electronics Engineers (IEEE). IEEE 754 sets forth standards at least for floating point number formats, required operations, and recommended operations. IEEE 754 defines formats for various precision levels, including: Half precision (2 bytes), Single precision (4 bytes), Double precision (8 bytes), and Quadruple precision (16 bytes).

For efficiency reasons, processor instruction set architectures often limit register sizes and floating point computations to a fixed number of bits. As a result, applications that desire increased accuracy and higher precision may seek to double the number of bits used for floating point representations. Doing so, however, can reduce the number of calculations that can be performed per cycle, can increase the instruction count, can decrease the number of data elements that can be stored in a data cache, and can require more memory operations.

What is needed is a way to vectorize in conformance with IEEE 754 using high-precision data when necessary for accuracy, and using low-precision data otherwise.

BRIEF DESCRIPTION OF THE DRAWINGS

The present invention is illustrated by way of example and not limitation in the figures of the accompanying drawings, in which like references indicate similar elements and in which:

FIG. 5A is pseudocode and a block flow diagram illustrating execution of a dual-destination type conversion instruction, according to an embodiment;

FIG. 5B is pseudocode and a block flow diagram illustrating execution of a dual-destination type conversion instruction, according to an embodiment;

FIG. 5C is pseudocode and a block flow diagram illustrating execution of a dual-destination type conversion instruction, according to an embodiment;

FIG. 5D is pseudocode and a block flow diagram illustrating execution of a dual-destination type conversion and accumulation instruction, according to an embodiment;

FIG. 5E is pseudocode and a block flow diagram illustrating execution of a dual-destination mixed precision type conversion and accumulation using two instructions, according to an embodiment;

FIG. 5F is pseudocode and a block flow diagram illustrating execution of a mixed precision type conversion and accumulation instruction, according to an embodiment;

FIG. 5G is pseudocode and a block flow diagram illustrating execution of a mixed precision atomic memory accumulation instruction, according to an embodiment;

FIG. 6A is a block diagram illustrating a generic vector friendly instruction format and class A instruction templates thereof according to embodiments of the invention;

FIG. 6B is a block diagram illustrating the generic vector friendly instruction format and class B instruction templates thereof according to embodiments of the invention;

FIG. 7A is a block diagram illustrating an exemplary specific vector friendly instruction format according to embodiments of the invention;

FIG. 7B is a block diagram illustrating the fields of the specific vector friendly instruction format 700 that make up the full opcode field 674 according to one embodiment of the invention;

FIG. 7C is a block diagram illustrating the fields of the specific vector friendly instruction format 700 that make up the register index field 644 according to one embodiment of the invention;

FIG. 8 is a block diagram of a register architecture according to one embodiment of the invention;

FIGS. 10A-B illustrate a block diagram of a more specific exemplary in-order core architecture, which core would be one of several logic blocks (including other cores of the same type and/or different types) in a chip;

FIG. 10A is a block diagram of a single processor core, along with its connection to the on-die interconnect network 1002 and with its local subset of the Level 2 (L2) cache 1004, according to embodiments of the invention;

FIG. 10B is an expanded view of part of the processor core in FIG. 10A according to embodiments of the invention;

FIG. 12 shown a block diagram of a system in accordance with one embodiment of the present invention;

FIG. 13 is a block diagram of a first more specific exemplary system in accordance with an embodiment of the present invention;

FIG. 14 is a block diagram of a second more specific exemplary system in accordance with an embodiment of the present invention;

FIG. 15 is a block diagram of a System-on-a-Chip (SoC) in accordance with an embodiment of the present invention; and FIG. 16 is a block diagram contrasting the use of a software instruction converter to convert binary instructions in a source instruction set to binary instructions in a target instruction set according to embodiments of the invention.

DETAILED DESCRIPTION

Figure 1:
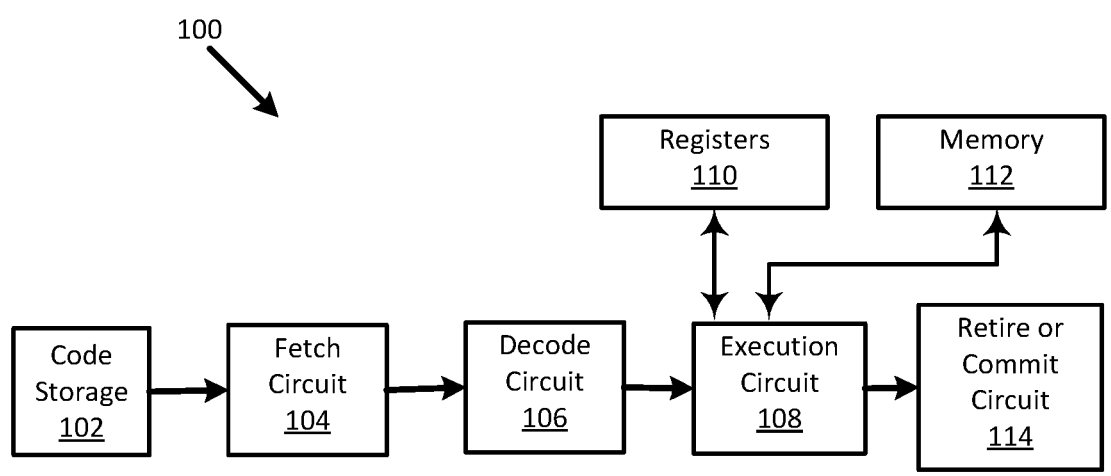
FIG. 1 is a block diagram illustrating processing components for executing instructions for dual-destination type conversion, accumulation, and atomic memory operations according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Use of mixed precision optimizations can advantageously improve a processor's power-efficiency performance insofar as high-precision floating point data can be used when higher accuracy is desired, and low precision data can be used otherwise. In other words, some data and computations are performed with lower precision representations of data, and higher-precision representations are used only when necessary for accuracy.

Mixed precision is also used in many of the standardized benchmark codes used as benchmarks for measuring machine performance. The benchmark codes include machine learning codes, as well as molecular dynamics codes (e.g., LAMMPS, NAMD, Amber).

While mixed precision calculations can improve performance, there is inefficiency due to the type conversions and the increase in the number of registers required to store the same operands. For example, accumulation/reduction of many values into a single value is a potential source of error with low-precision representations of data. The ability to perform mixed-precision operations may alleviate potential sources of error by applying high-precision to selected operations and selected operands.

Unfortunately, in some current processors, adding a packed single-precision (SP) register to two packed double-precision (DP) registers requires at least five instructions:

1. Instruction to cast the elements in the lower lane of the SP source register to a packed DP destination register,
2. Adding one pair of registers in dual-precision,
3. Extracting the high lanes of the SP source register,
4. Casting the extracted lanes to dual-precision, and
5. Adding the other pair of registers in dual precision.

Embodiments disclosed herein provide an advantage to a processor's instruction set architecture by providing instructions to reduce the instruction count for certain mixed precision operations. In some embodiments, a processor instruction set architecture is extended to support mixed precision operations with lower instruction counts and/or increased symmetry for execution on multiple vector ports.

The disclosed mixed precision operations include dual type conversion (e.g., converting two halves of a single vector register containing single-precision data elements into double-precision data elements—in conformance with IEEE 754—to be stored in two destination vector registers), accumulation (e.g., converting two halves of a single vector register containing single-precision data elements into double-precision values—in conformance with IEEE 754—to be added to double precision data values previously stored in two destination vector registers), and atomic memory operations (e.g., converting two halves of a single vector register containing single-precision data elements into double-precision values—in conformance with IEEE 754—and atomically adding them to a vector in memory containing double-precision data elements).

FIG. 1 is a block diagram illustrating processing components for executing instructions for dual-destination type conversion, accumulation, and atomic memory operations according to some embodiments. As shown, computing system 100 includes code storage 102, fetch circuit 104, decode circuit 106, execution circuit 108, registers 110, memory 112, and retire or commit circuit 114. An instruction is fetched by fetch circuit 104 from code storage 102, which may comprise a cache memory, an on-chip memory, a memory on the same die as the processor, an instruction register, a general register, or system memory, without limitation. In one embodiment, the instruction has a format similar to that of instruction 200 in FIG. 2A. In another embodiment, the instruction has a format similar to that of instruction 250 in FIG. 2B. After fetch circuit 104 fetches an instruction from code storage 102, decode circuit 106 is to decode the instruction, including by parsing the various fields of the instruction. After decoding the fetched instruction, execution circuit 108 is to execute the decoded instruction. Several exemplary embodiments of the execution circuit 106 are illustrated and described with respect to FIGS. 3 to 5G. In performing the step of executing the instruction, execution circuit 108 may read data from and write data to registers 110 and memory 112. Registers 110 may include a data register, an instruction register, a vector register, a mask register, a general purpose register, an on-chip memory, a memory on the same die as the processor, or a memory in the same package as the processor, without limitation. Memory 112 may include an on-chip memory, a memory on the same die as the processor, a memory in the same package as the processor, a cache memory, or system memory, without limitation. After execution circuit 108 executes the instruction, retire or commit circuit 114 is to retire or commit the instruction, ensuring that execution results are written to or have been written to their destinations, and freeing up or releasing resources for later use.

Figure 2A:
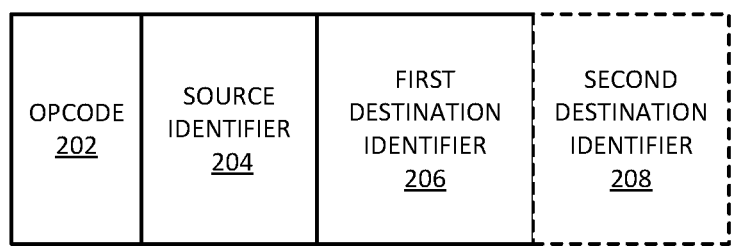
FIG. 2A is a block diagram illustrating a format for instructions for dual-destination type conversion, accumulation, and atomic memory operations, according to some embodiments.

FIG. 2A is a block diagram illustrating a format for instructions for dual-destination type conversion, accumulation, and atomic memory operations, according to some embodiments. As shown, instruction 200 includes opcode 202, source identifier 204, first destination identifier 206, and an optional second destination identifier 208 (optional instruction fields are shown in a box with dashed borders).

Source identifier 204, in some embodiments, is to specify a source vector register, such as the vector registers included in a processor's register file. FIG. 8 and its associated description further below describes an embodiment of a processor's register file. In some embodiments, source identifier 204 is to identify a memory location First destination identifier 206 and optional second destination identifier 208 identify two locations—either vector registers of the processor's register file or memory locations—to which to write execution results according to some embodiments described below, for example, with reference to FIGS. 3 to 5G.

Figure 2B:
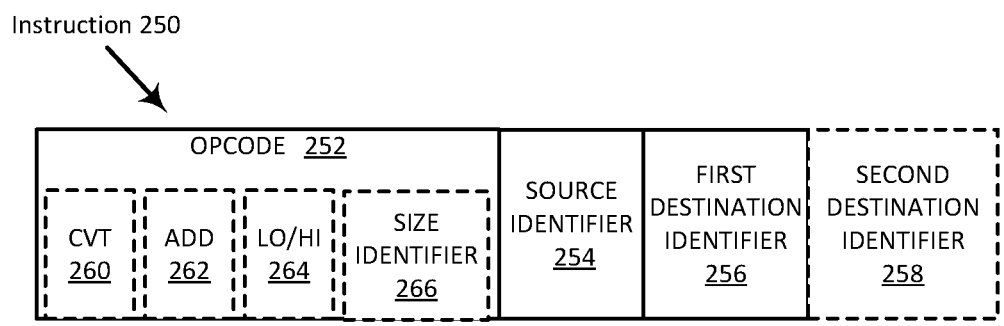
FIG. 2B is a block diagram illustrating a format for instructions for dual-destination type conversion, accumulation, and atomic memory operations, according to some embodiments.

FIG. 2B is a block diagram illustrating a format for instructions for dual-destination type conversion, accumulation, and atomic memory operations, according to some embodiments. As shown, instruction 250 includes opcode 252, source identifier 254, first destination identifier 256, and an optional second destination identifier 258 (optional instruction fields are shown in a box with dashed borders).

Source identifier 254, in some embodiments, is to specify a source vector register, such as the vector registers included in a processor's register file. FIG. 8 and its associated description further below describes an embodiment of a processor's register file. In some embodiments, source identifier 254 is to identify a memory location First destination identifier 256 and optional second destination identifier 258 identify two locations—either vector registers of the processor's register file or memory locations—to which to write execution results according to some embodiments described below, for example, with reference to FIGS. 3 to 5G.

In some embodiments, opcode 252 includes CVT 260, an optional field to specify that the operation to be performed by the instruction 250 is to include a conversion, for example, from single-precision to double-precision.

In some embodiments, opcode 252 includes ADD 262, an optional field to specify that the operation to be performed by the instruction 250 is to accumulate a result with the data previously stored in the location identified by the first destination identifier 256 and/or the second destination identifier 258.

In some embodiments, opcode 252 includes LO/HI 264, an optional field to specify that the operation to be performed by the instruction 250 is to process only half of the source vector specified by the source identifier 254. For example, when LO/HI 264 field is "LO," the lower half of the source vector is to be processed, and when the LO/HI 264 field is "HI," the upper half of the source vector is to be processed. When LO/HI 264 field is included in instruction 250, the instruction will need to be executed at least twice in order to process the entire source vector identified by the source identifier 254.

In some embodiments, opcode 252 includes optional size identifier 266, such as a prefix or suffix, "B," "W," "D," and "Q," to specify a size-1 byte, 2 bytes, 4 bytes, or 8 bytes, respectively—of each source vector element. In some embodiments, the optional size identifier 266 is included in the opcode as a prefix or suffix, "H," "S," "D," "Q" and "E," corresponding to precision levels—Half precision (2 bytes), Single precision (4 bytes), Double precision (8 bytes), and Quadruple precision (16 bytes), respectively—of each source vector element. In other embodiments, optional size identifier 266 is an instruction parameter or operand specifying the source vector element's size and/or precision level.

Figure 3:
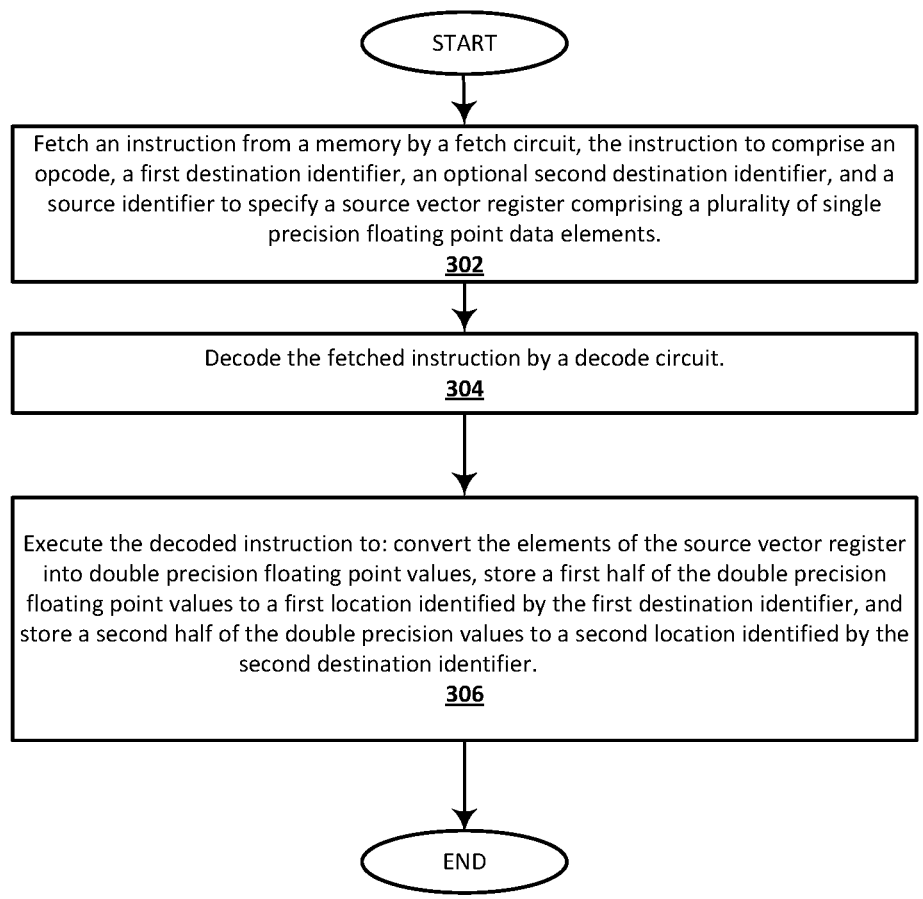
FIG. 3 is a flow diagram of a process to be performed by a processor to execute an instruction for dual-destination type conversion, accumulation, and/or atomic memory operations, according to some embodiments.

FIG. 3 is a flow diagram of a process to be performed by a processor to execute an instruction for dual-destination type conversion, accumulation, and/or atomic memory operations. After starting, the process at 302 is to fetch an instruction from a code storage by a fetch circuit, the instruction to include an opcode, a first destination identifier, an optional second destination identifier, and a source identifier to specify a source vector register comprising a plurality of single precision floating point data elements. At 304, the fetched instruction is to be decoded by a decode circuit. At 306, an execution circuit is to execute the decoded instruction on each element of the source vector register. The process then ends.

Figure 4:
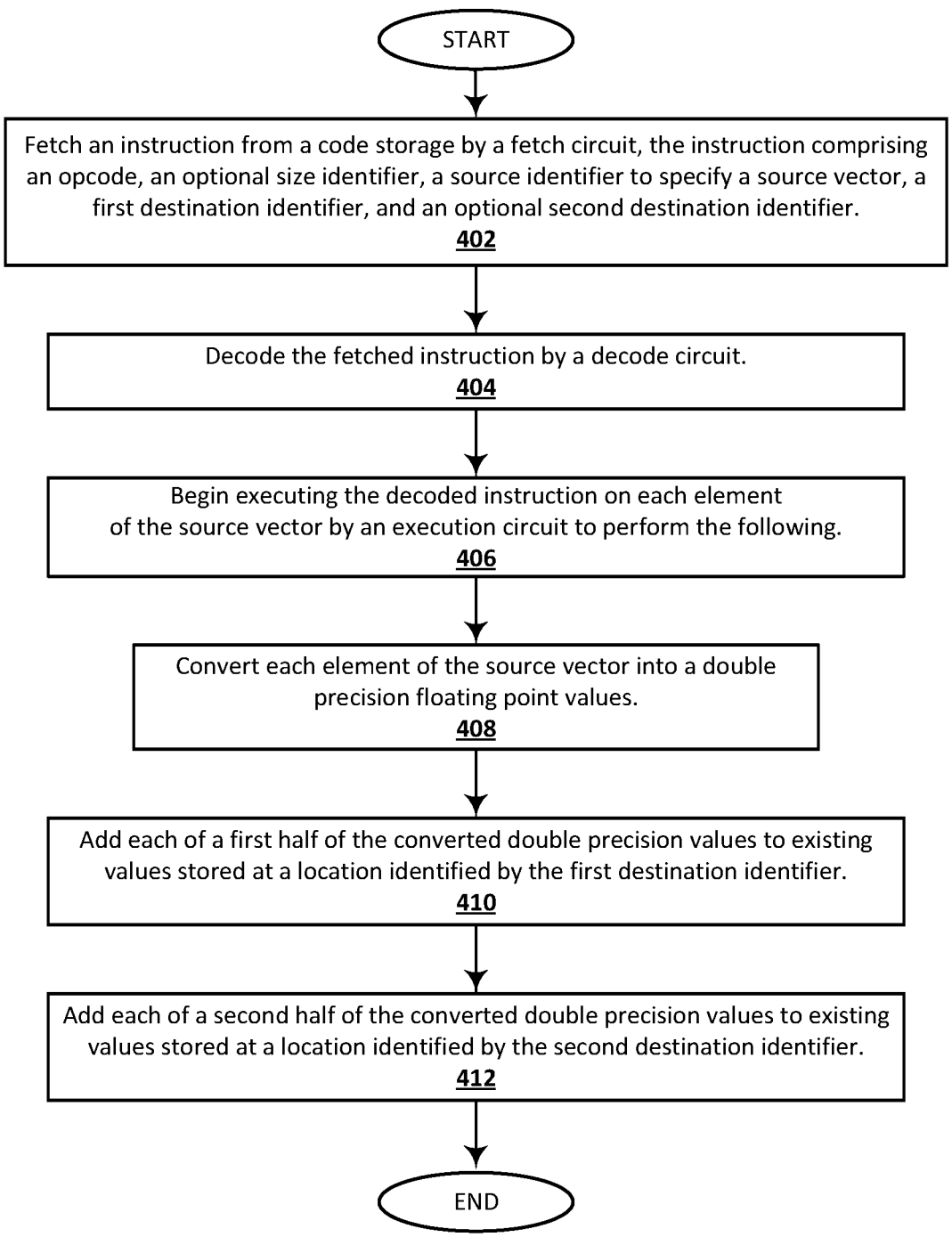
FIG. 4 illustrates an exemplary execution of an instruction for dual-destination type conversion, accumulation, and/or atomic memory operations, according to some embodiments.

FIG. 4 is a flow diagram of a process to be performed by a processor to execute an instruction for dual-destination type conversion, accumulation, and/or atomic memory operations. After starting, a fetch circuit at 402 is to fetch an instruction from a code storage, the instruction including an opcode, an optional size identifier, a source identifier to identify a source vector, a first destination identifier, and an optional second destination identifier.

FIG. 2B illustrates optional fields that can be included in an instruction for dual-destination type conversion, accumulation, and/or atomic memory operations. In some embodiments, the number and type of instruction operands is specified by an indication in the opcode. For example, when the opcode includes "LO" or "HI," the instruction is to operate on a low part or a high part of the source vector. For example, when the opcode includes "ADD," the instruction is to accumulate or add to the data previously stored in the destination. For example, when the opcode includes "CVT," the instruction is to convert the data in the source vector. In other embodiments, the opcode may be modified, without limitation, to specify a particular behavior or particular source and destination operands.

At 404, the fetched instruction is to be decoded by a decode circuit. In some embodiments, the source vector is to be stored in a vector register of the processor's register file, described, for example, with respect to FIG. 8. In other embodiments, the source vector is to be stored at a memory location, and is to be retrieved and stored in a vector register.

At 406, an execution circuit is to begin executing the decoded instruction on each element of the source vector to perform at least 408 and 410. At 408, the execution circuit is to convert each element of the source vector register into a double precision floating point value. The resulting vector will be twice as wide as the source vector, in terms of bits. At 410, the execution circuit is to add (or accumulate) each of a first half of the converted double precision values to existing vector elements of a first destination vector identified by the first destination identifier. At 412, the execution circuit is to add (or accumulate) each of a second half of the converted double precision values to existing vector elements of a second destination vector identified by the second destination identifier. The process then ends.

Consider, for example, fetching and decoding an instruction that specifies conversion of 16 4-byte (32 bits), single-precision vector elements stored in 64 bytes (512 bits) of vector register zmm1. The exemplary instruction further calls for converting—in conformance with IEEE 754—the source vector register into double-precision, and storing half of the upconverted, double-precision vector elements into each of zmm2 and zmm3. After execution, for example, 4-byte (32 bit), single-precision elements 0 to 7 of the source vector, totaling 256 bits, will be converted into 8-byte (64-bit), double precision values, totaling 512 bits, and stored as 64 bytes in elements 0 to 7 of the first destination, while single precision elements 8 to 15 of the source vector will be converted from 4-byte single precision values, totaling 256 bits, to 8-byte double precision values, totaling 512 bits, and stored as 64 bytes in elements 8 to 15 of the second destination.

FIGS. 5A-5G are pseudocode and block flow diagrams illustrating various embodiments of processes to be performed by a processor to execute instructions for dual-destination type conversion, mixed-precision accumulation, and mixed-precision atomic memory operations;

In some embodiments, pseudocode listed in FIGS. 5A-5G is to operate on elements of a source vector operand, serially, one element at a time. In some embodiments, the pseudocode 500 is to operate on multiple elements of source operand, zmm1, in parallel.

Embodiments of the pseudocode listed in FIGS. 5A-5G may be implemented in hardware, software, firmware, or a combination of such implementation approaches. Some embodiments of pseudocode are to be implemented as computer programs or program code executing on programmable systems comprising at least one processor, a storage system (including volatile and non-volatile memory and/or storage elements), at least one input device, and at least one output device.

It should be understood that the pseudocode listed in FIGS. 5A-5G does not by itself suffice to perform all aspects of an application or other software. The pseudocode listed in FIGS. 5A-5G is to illustrate relevant aspects of embodiments disclosed herein. Additional software routines to control inputs and outputs and other functionality are known to those of ordinary skill and may be used.

Figure 5A:
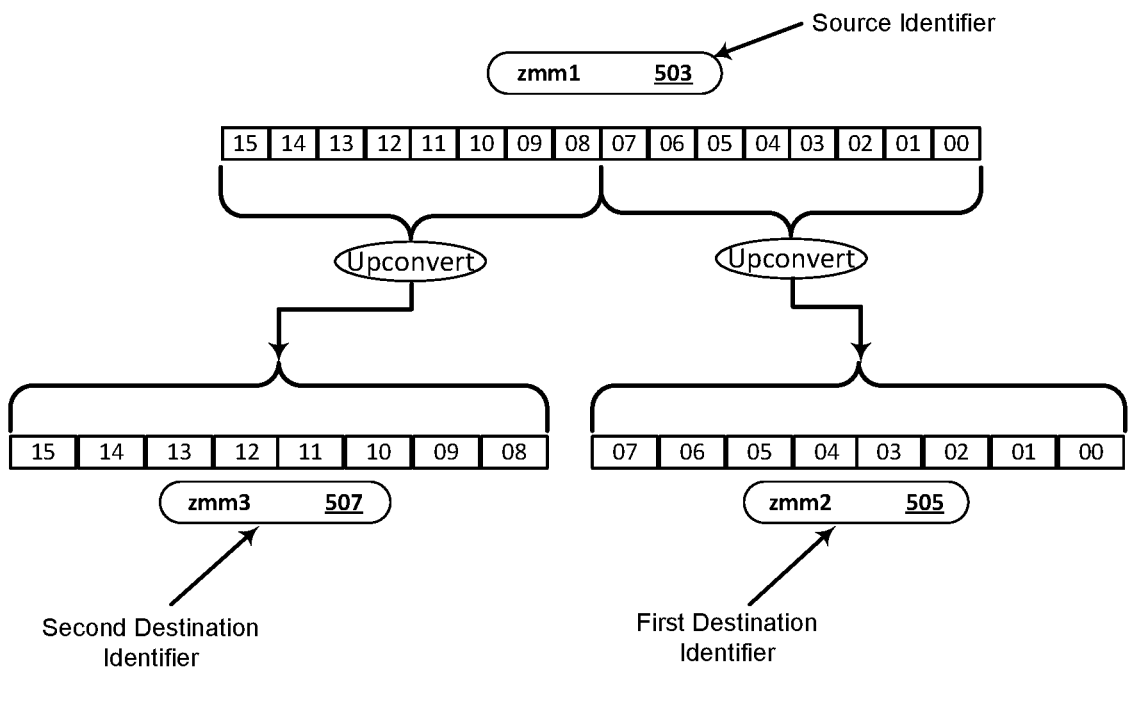
FIGS. 5A-5G are pseudocode and block flow diagrams illustrating various embodiments of executing an instruction for dual-destination type conversion, mixed-precision accumulation, or mixed-precision atomic memory operations, according to some embodiments.

FIG. 5A is pseudocode and a block flow diagram illustrating execution of a dual-destination type conversion instruction, according to an embodiment. Pseudocode 500 and block diagram 501 illustrate an embodiment that is to fetch, decode, and execute a VCVTPS2PD2 dual-destination type conversion instruction—in conformance with IEEE 754—that includes a source identifier to specify source vector register zmm1 503, a first destination identifier to specify first destination vector register zmm2 505, and a second destination identifier to specify second destination vector register zmm3 507. The instruction opcode, VCVTPS2PD2, is selected to illustrate a non-limiting example; other opcodes can be used, without limitation. As shown, 8 lower half elements of zmm1 are converted—in conformance with IEEE 754—to double precision, doubling their bit widths, and stored in 8 elements of zmm2, while 8 upper half elements of zmm1 are converted—in conformance with IEEE 754—to double precision, doubling their bit widths, and stored in 8 elements of zmm3.

Figure 5B:
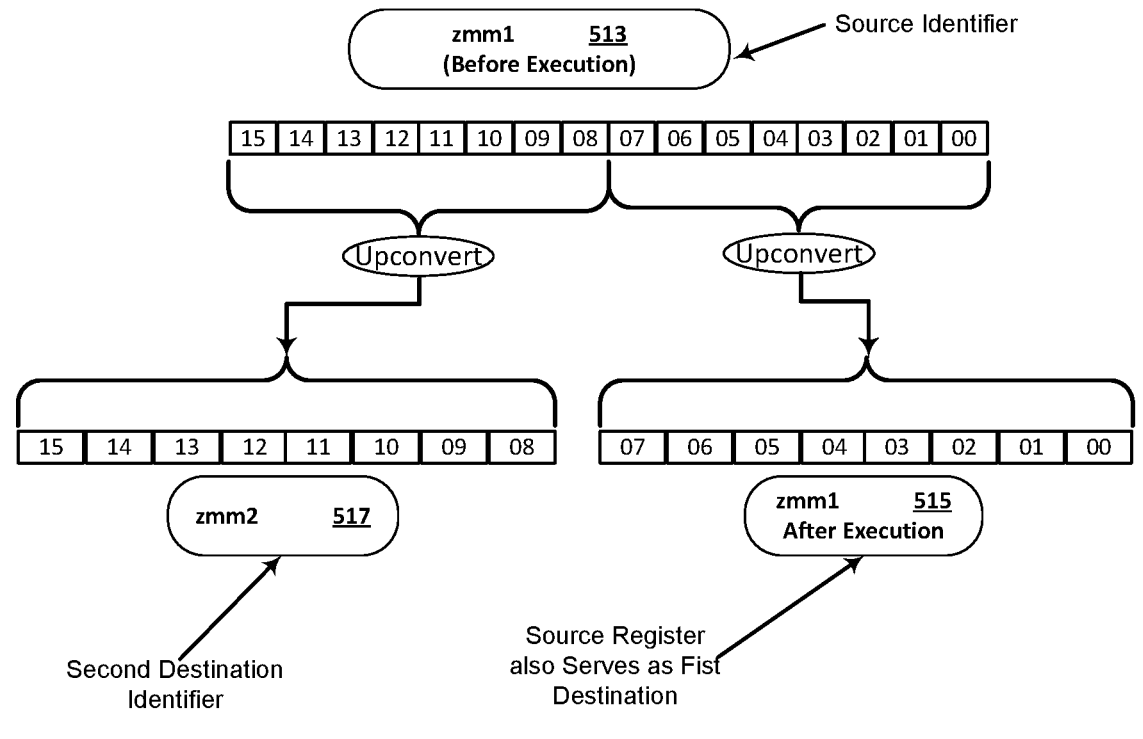

FIG. 5B is pseudocode and a block flow diagram illustrating execution of a dual-destination type conversion instruction, according to an embodiment. Pseudocode 510 and block diagram 511 illustrate that execution includes fetching, decoding, and executing a VCVTPS2PD2 dual-destination type conversion instruction that includes a source identifier to specify vector register zmm1 513, no first destination identifier because zmm1 is also to serve as a destination, and a second destination identifier to specify zmm2 517. In this embodiment, the source register is also to serve as the first destination register. Here, the source register is shown before execution as 513 and after execution as 515. As shown, 8 lower half elements of zmm1 513 are upconverted—in conformance with IEEE 754—to double precision and stored in 8 elements of zmm1 515 (After Execution), while 8 upper half elements of zmm1 513 are converted—in conformance with IEEE 754—to double precision and stored in 8 elements of zmm2 517.

Figure 5C:
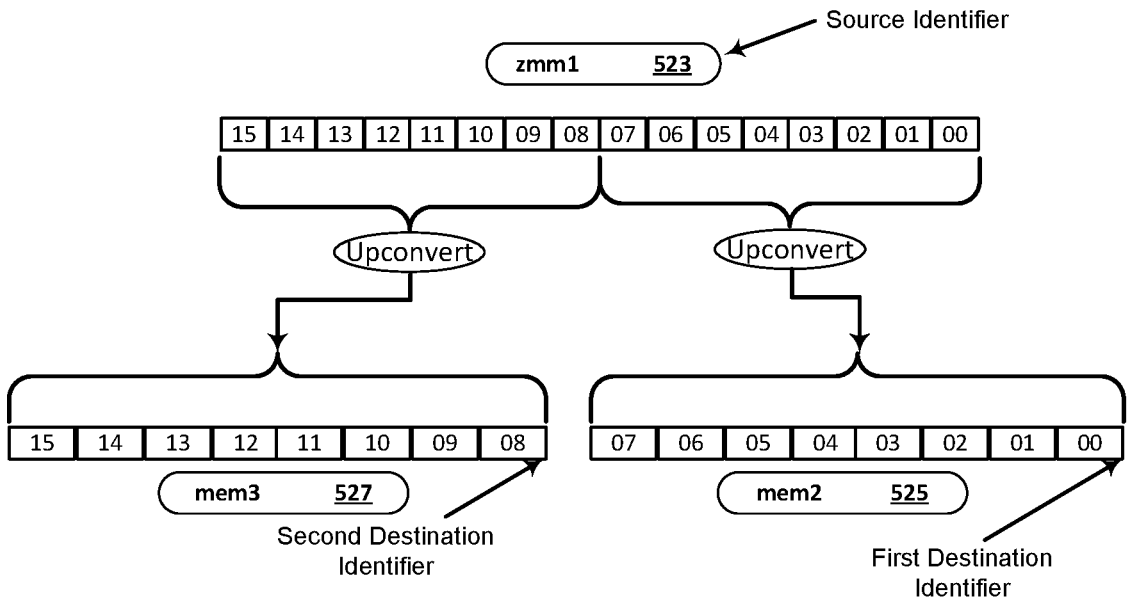

FIG. 5C is pseudocode and a block flow diagram illustrating execution of a dual-destination type conversion instruction, according to an embodiment. Pseudocode 520 and block diagram 521 illustrate an embodiment that is to fetch, decode, and execute a VCVTPS2PD2 dual-destination type conversion instruction—in conformance with IEEE 754—that includes a source identifier to specify source vector register zmm1 523, a first destination identifier to specify the first destination memory location mem2 525, and a second destination identifier to specify the second destination memory location mem3 527. As shown, 8 lower half elements of zmm1 are converted—in conformance with IEEE 754—to double precision and stored in 8 elements of the first destination memory location mem2 525, while 8 upper half elements of zmm1 are converted—in conformance with IEEE 754—to double precision and stored in 8 elements of second destination memory location mem3 527.

Figure 5D:
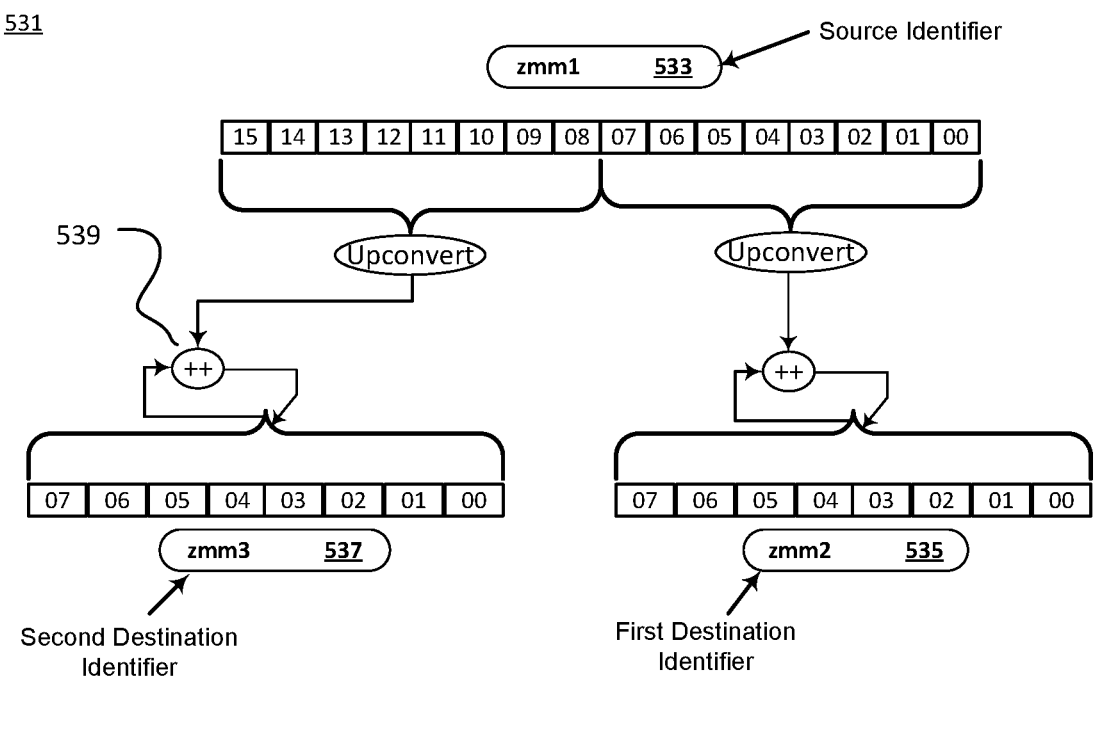

FIG. 5D is pseudocode and a block flow diagram illustrating execution of a dual-destination type conversion and accumulation instruction, according to an embodiment. Pseudocode 530 and block diagram 531 illustrate an embodiment that is to fetch, decode, and execute a VADDPS2PD mixed precision type conversion—in conformance with IEEE 754—and accumulation instruction that includes a source identifier to specify source vector register zmm1 533, a first destination identifier to specify a first destination register zmm2 535, and a second destination identifier to specify a second destination register zmm3 537. As shown, 8 lower half elements of zmm1 are converted—in conformance with IEEE 754—to double precision and accumulated with or added to data that was previously stored in 8 elements of zmm2 535, while 8 upper half elements of zmm1 are converted—in conformance with IEEE 754—to double precision and accumulated with or added to data that was previously stored in 8 elements of zmm3 537.

Figure 5E:
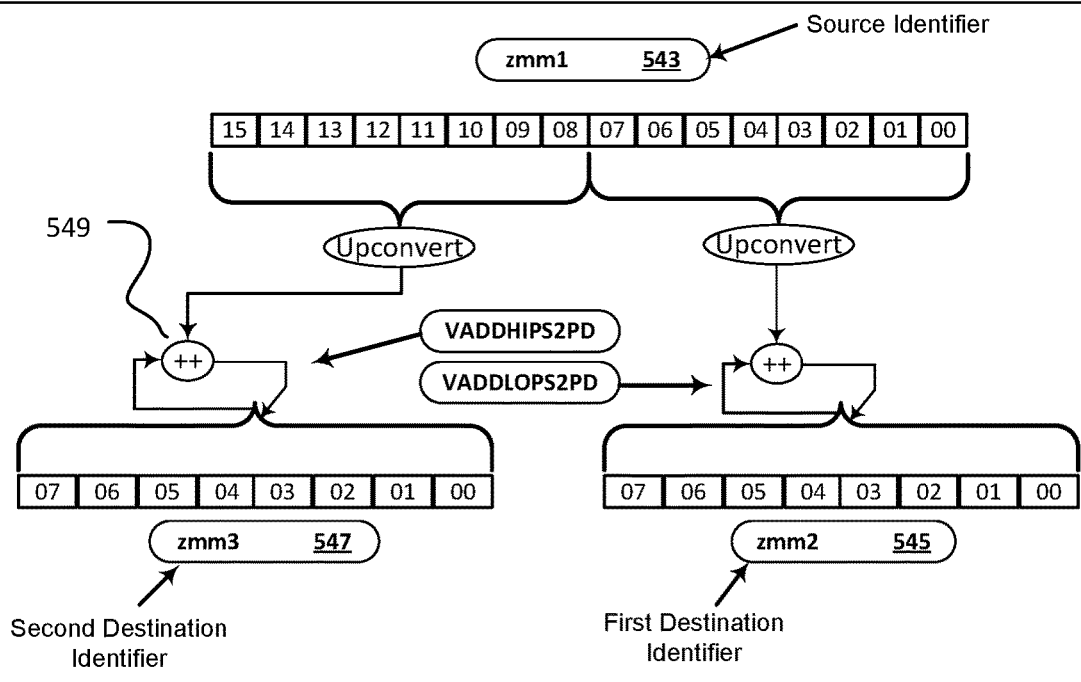

FIG. 5E is pseudocode and a block flow diagram illustrating execution of a dual-destination mixed precision type conversion and accumulation using two instructions, according to an embodiment. Pseudocode 540 and block diagram 541 illustrate an embodiment that is to fetch, decode, and execute two instructions: VADDLOPS2PD and VADDHIPS2PD mixed precision type conversion and accumulation instructions that each include a source identifier to specify a source vector register zmm1 543, and a destination identifier. The VADDLOPS2PD instruction is to upconvert the "LO" half of the source vector register zmm1 543, elements [00:07], and to accumulate or add the upconverted values to the corresponding values previously stored in destination register zmm2 545. The VADDHIPS2PD instruction is to upconvert the "HI" half of the source vector register zmm1 543, elements [08:15], and to accumulate or add the upconverted values to the corresponding values previously stored in destination register zmm3 547. As shown, after executing the two instructions, 8 lower half elements of zmm1 543 have been converted—in conformance with IEEE 754—to double precision and accumulated with 8 elements of zmm2 545, while 8 upper half elements of zmm1 543 have been converted—in conformance with IEEE 754—to double precision and accumulated with 8 elements of zmm3 547.

Figure 5F:
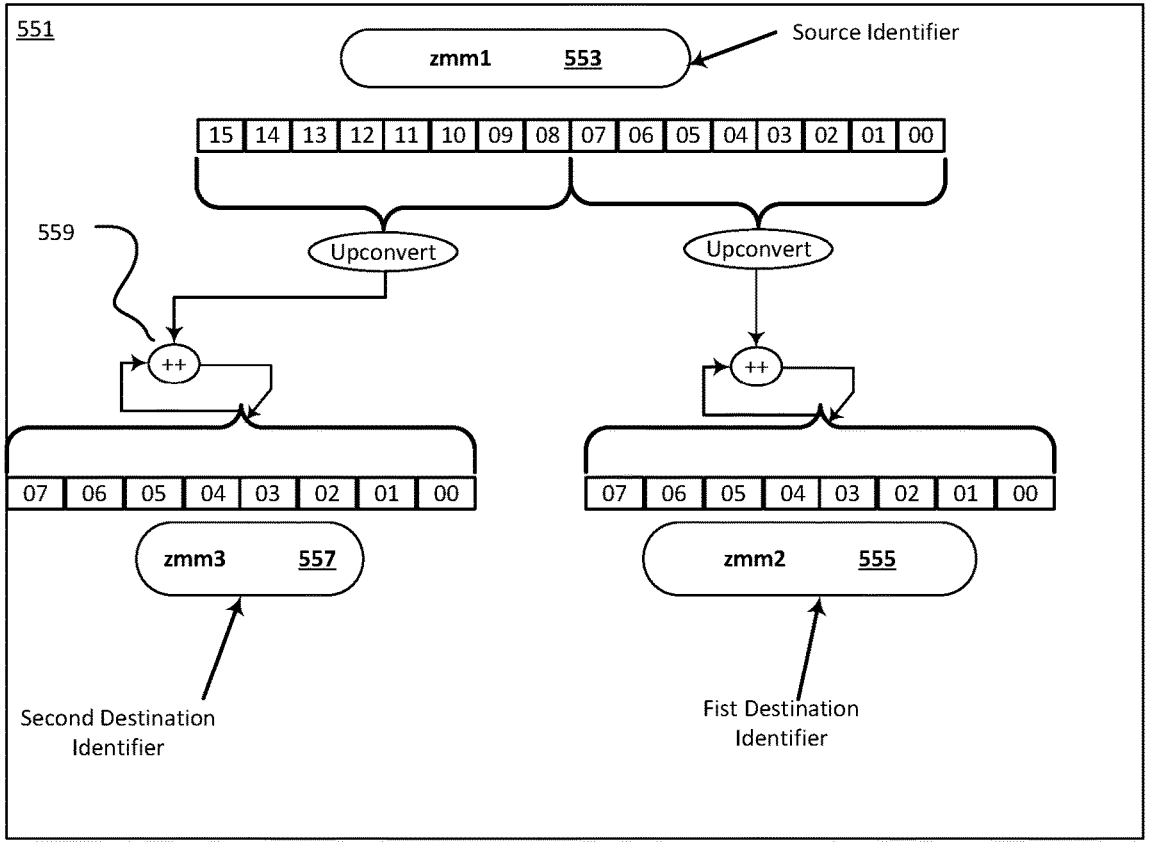

FIG. 5F is pseudocode and a block flow diagram illustrating execution of a mixed precision type conversion and accumulation instruction, according to an embodiment. Pseudocode 550 and block diagram 551 illustrate an embodiment that is to fetch, decode, and execute a VLADDPS2PD mixed precision atomic memory accumulation instruction that includes a source identifier to specify source vector register zmm1 553, a first destination identifier to specify first destination vector register zmm2 555, and a second destination identifier to specify second destination vector register zmm3 557. As shown, 8 lower half elements of zmm1 553 are converted—in conformance with IEEE 754—to double precision and accumulated with or added to the data that was previously stored in the 8 elements stored in zmm2 555. As shown, 8 upper half elements of zmm1 553 are converted—in conformance with IEEE 754—to double precision and accumulated with or added to the data that was previously stored in the 8 elements of zmm3 557.

Figure 5G:
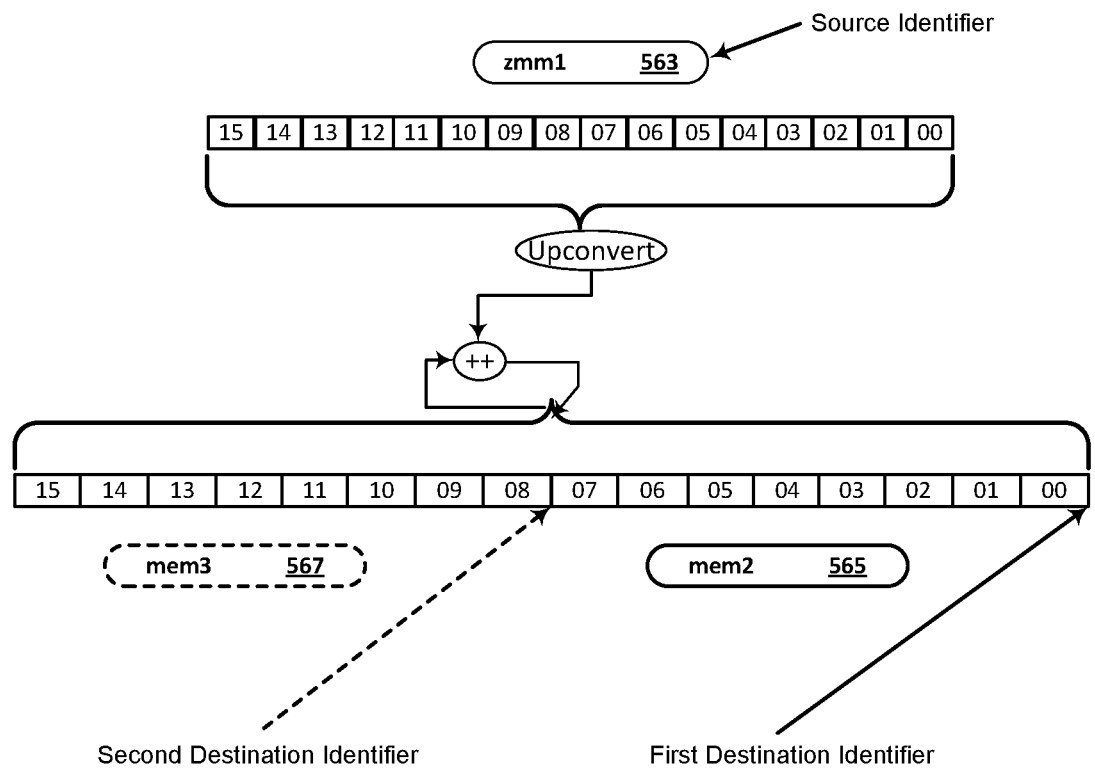

FIG. 5G is pseudocode and a block flow diagram illustrating execution of a mixed precision atomic memory accumulation instruction, according to an embodiment. Pseudocode 560 and block diagram 561 illustrate an embodiment that is to fetch, decode, and execute a VLADDPS2PD mixed precision atomic memory accumulation instruction that includes a source identifier to specify source vector register zmm1 563, a first destination identifier to specify first destination memory location mem2 565, and an optional second destination identifier to specify a second memory location mem3 567. The second destination identifier illustrated in FIG. 5G with a dashed line to indicate that it is optional: in some embodiments, just the first destination identifier is to be provided and used to identify 16 contiguous memory locations. As shown, 16 elements of zmm1 563 are converted—in conformance with IEEE 754—to double precision and accumulated with or added to the data that was previously stored in the 16 elements starting at mem2 565, a memory location. As shown, 8 upper half elements of zmm1 563 are converted—in conformance with IEEE 754— to double precision and accumulated with or added to the data that was previously stored in the 8 elements of mem3 567, a memory location.

In other embodiments (not shown), the operations illustrated in FIG. 5G are to be performed using two vector instructions: a first, "LO" instruction to upconvert and accumulate the 8 "LO" elements of zmm1 563 and add it or accumulate it with the elements of the first destination, and a second, "HI" instruction to upconvert and accumulate the 8 "HI" elements of zmm1 with the data previously stored in zmm3.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
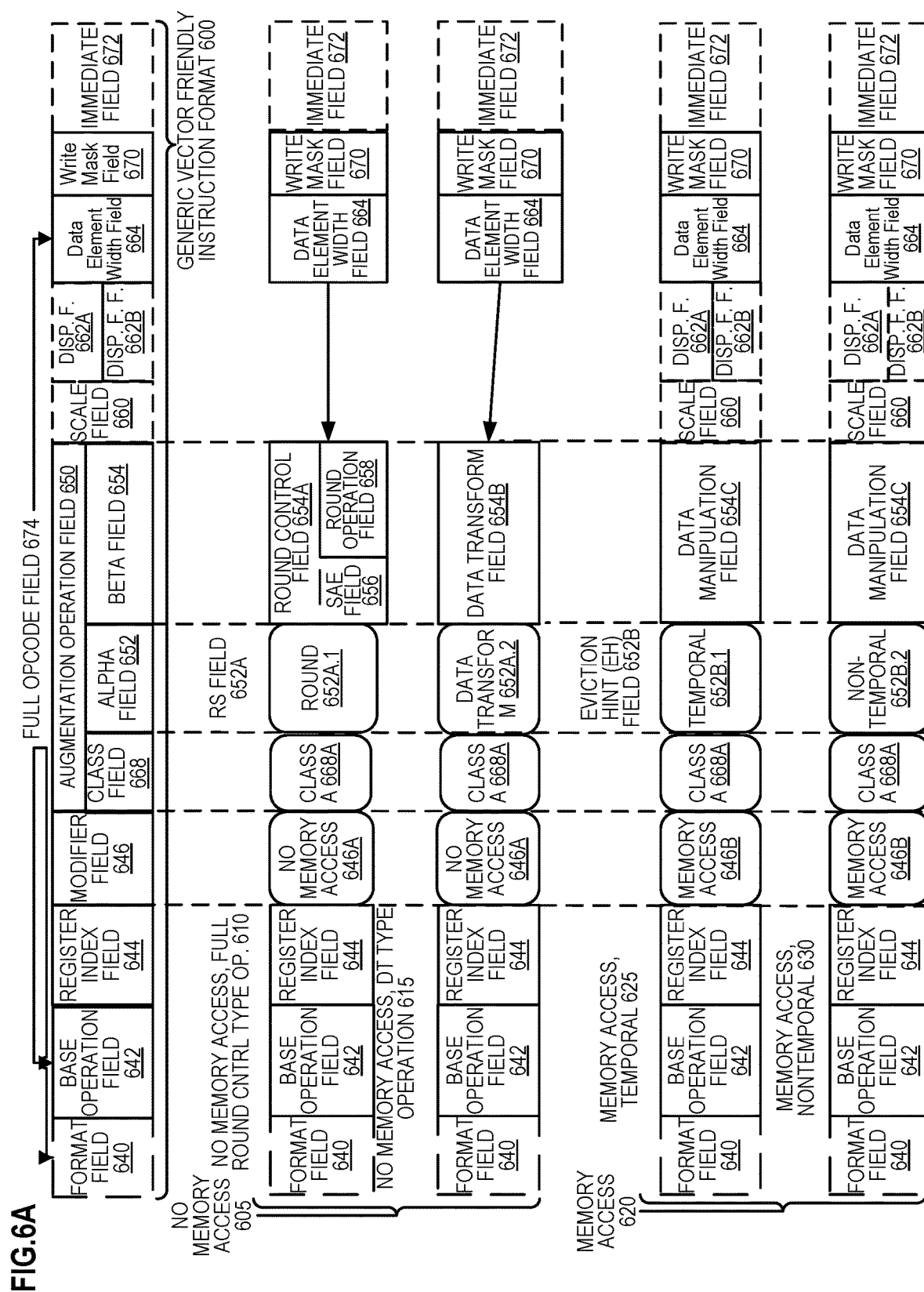
FIGS. 6A-6B are block diagrams illustrating a generic vector friendly instruction format and instruction templates thereof according to embodiments of the invention.
Figure 6B:
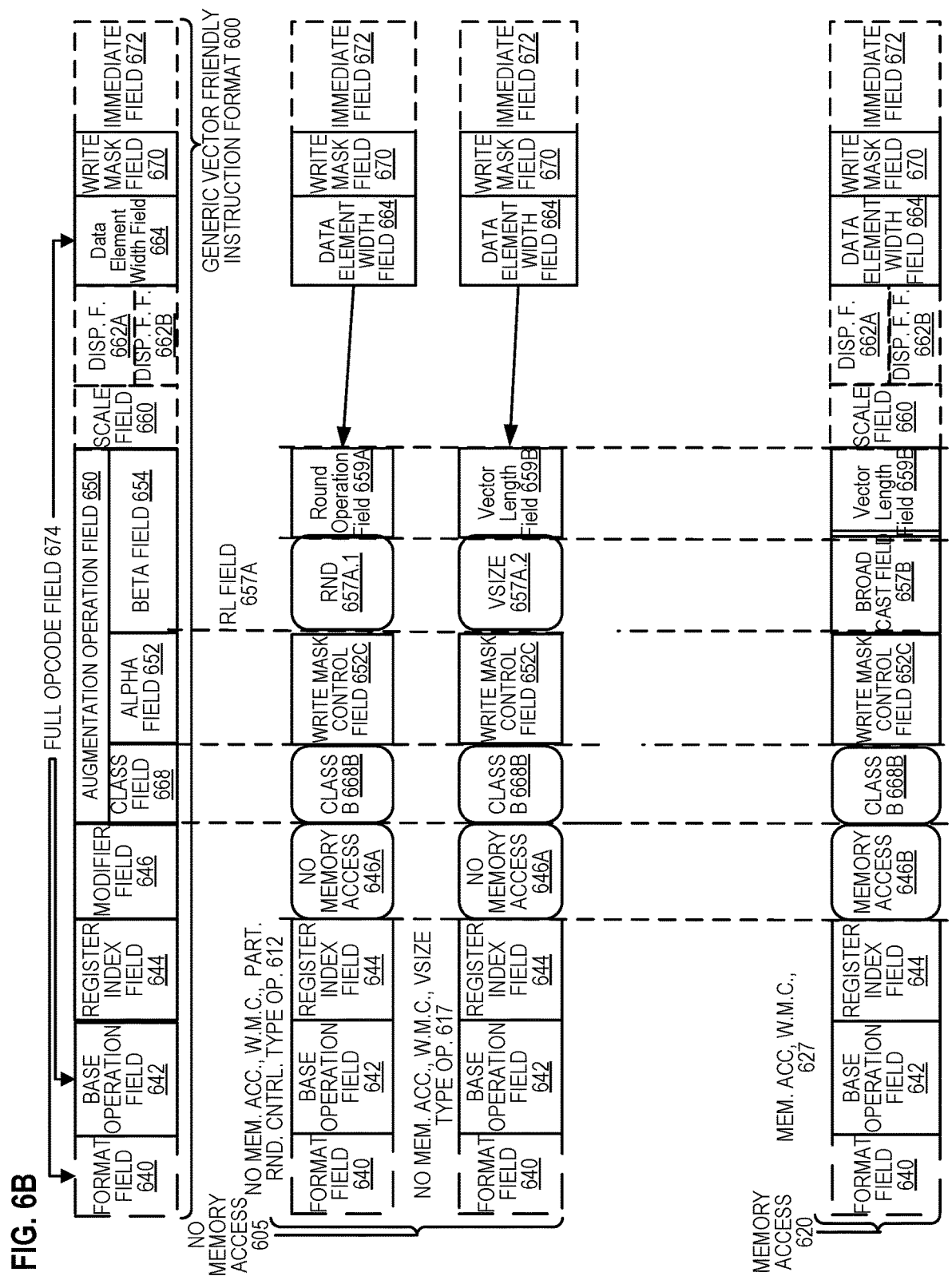

FIGS. 6A-6B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*$index+base).

Displacement Field 662A—its content is used as part of memory address generation (e.g., for address generation that uses $2^{scale}*$index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access, full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates, suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the invention where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the invention where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7A is a block diagram illustrating an exemplary specific vector friendly instruction format according to embodiments of the invention. FIG. 7A shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R1M field, SIB field, displacement field, and immediate fields of the existing x86 instruction set with extensions. The fields from FIG. 6 into which the fields from FIG. 7A map are illustrated.

It should be understood that, although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]-R), EVEX.X bit field (EVEX byte 1, bit [6]-X), and 657BEX byte 1, bit [5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]-mmmm)—its content encodes an implied leading opcode byte (OF, OF 38, or OF 3).

Data element width field 664 (EVEX byte 2, bit [7]-W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]-EH; also, known as EVEX.EH, EVEX.rs, EVEX.RL, EVEX.write mask control, and EVEX.N; also, illustrated with a)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also, illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes' offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the invention. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the invention. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
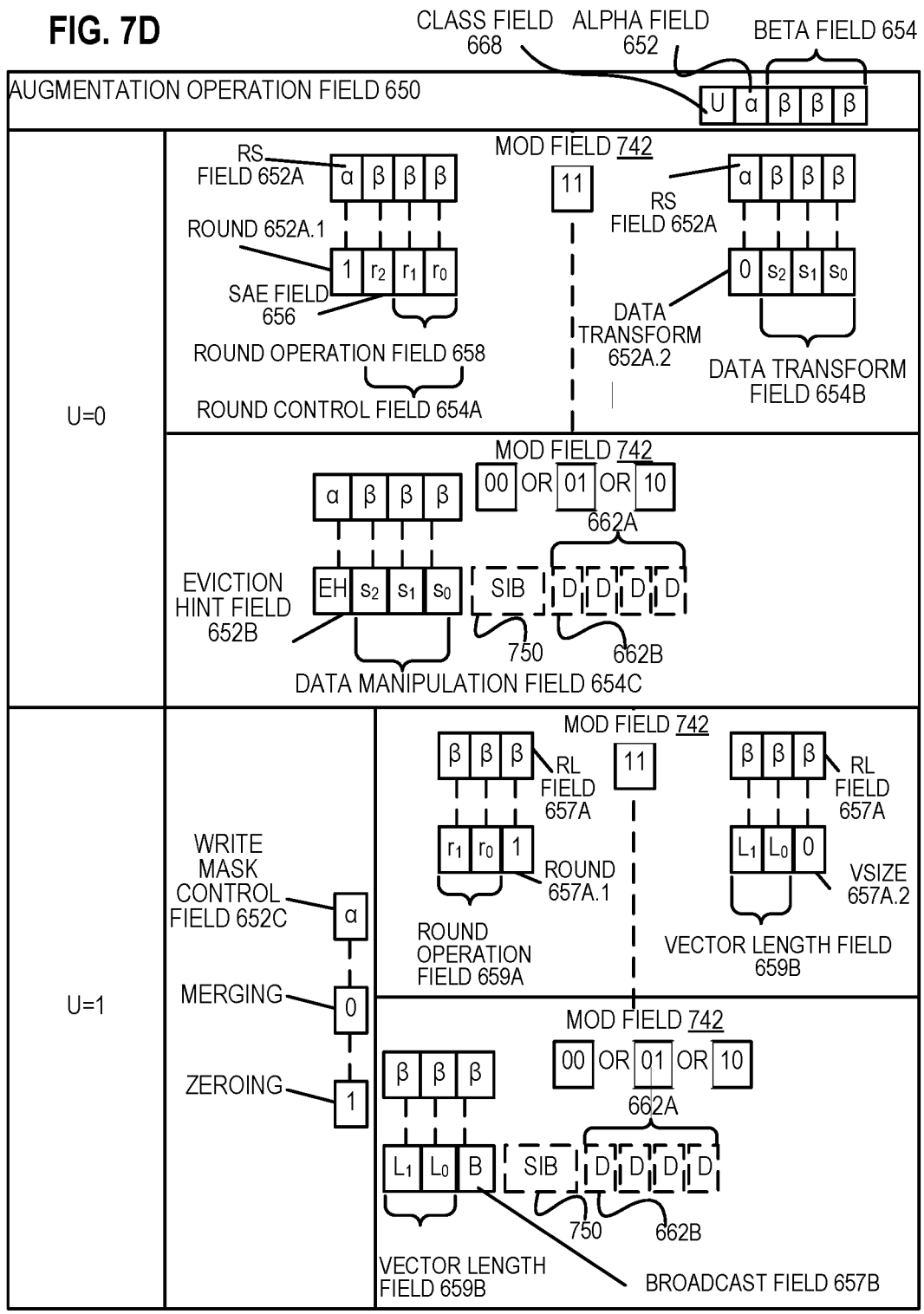
FIG. 7D is a block diagram illustrating the fields of the specific vector friendly instruction format that make up the augmentation operation field according to one embodiment of the invention.

FIG. 7D is a block diagram illustrating the fields of the specific vector friendly instruction format 700 that make up the augmentation operation field 650 according to one embodiment of the invention. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]-EH) is interpreted as the rs field 652A. When the rs field 652A contains a 1 (round 652A.1), the beta field 654 (EVEX byte 3, bits [6:4]-SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]-SSS) is interpreted as a three bit data transform field 654B. When U=0 and the MOD field 742 contains 00, 01, or 10 (signifying a memory access operation), the alpha field 652 (EVEX byte 3, bit [7]-EH) is interpreted as the eviction hint (EH) field 652B and the beta field 654 (EVEX byte 3, bits [6:4]-SSS) is interpreted as a three bit data manipulation field 654C.

When U=1, the alpha field 652 (EVEX byte 3, bit [7]-EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]-$S_{2-1}$) is interpreted as the round operation field 659A, while when the RL field 657A contains a 0 (VSIZE 657.A2) the rest of the beta field 654 (EVEX byte 3, bit [6-5]-$S_{2-1}$) is interpreted as the vector length field 659B (EVEX byte 3, bit [6-5]-$L_{1-0}$). When U=1 and the MOD field 742 contains 00, 01, or 10 (signifying a memory access operation), the beta field 654 (EVEX byte 3, bits [6:4]-SSS) is interpreted as the vector length field 659B (EVEX byte 3, bit [6-5]-$L_{1-0}$) and the broadcast field 657B (EVEX byte 3, bit [4]-B).

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 bytes, 32 bytes, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 9A:
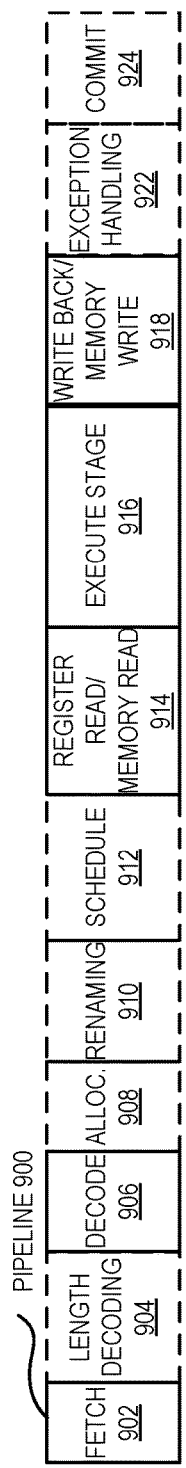
FIG. 9A is a block diagram illustrating both an exemplary in-order pipeline and an exemplary register renaming, out-of-order issue/execution pipeline according to embodiments of the invention.
Figure 9B:
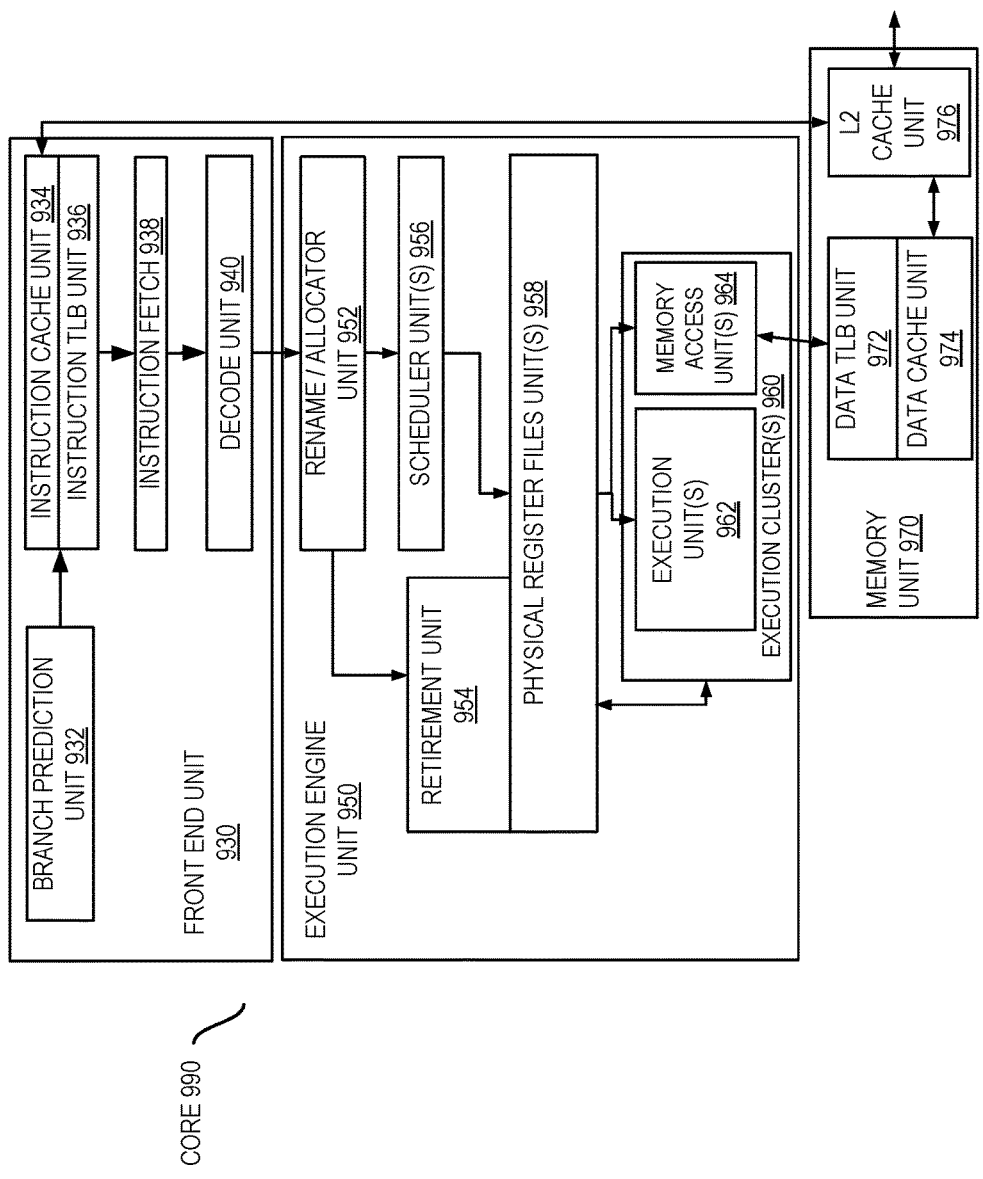
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length-decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register-renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 1013 includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
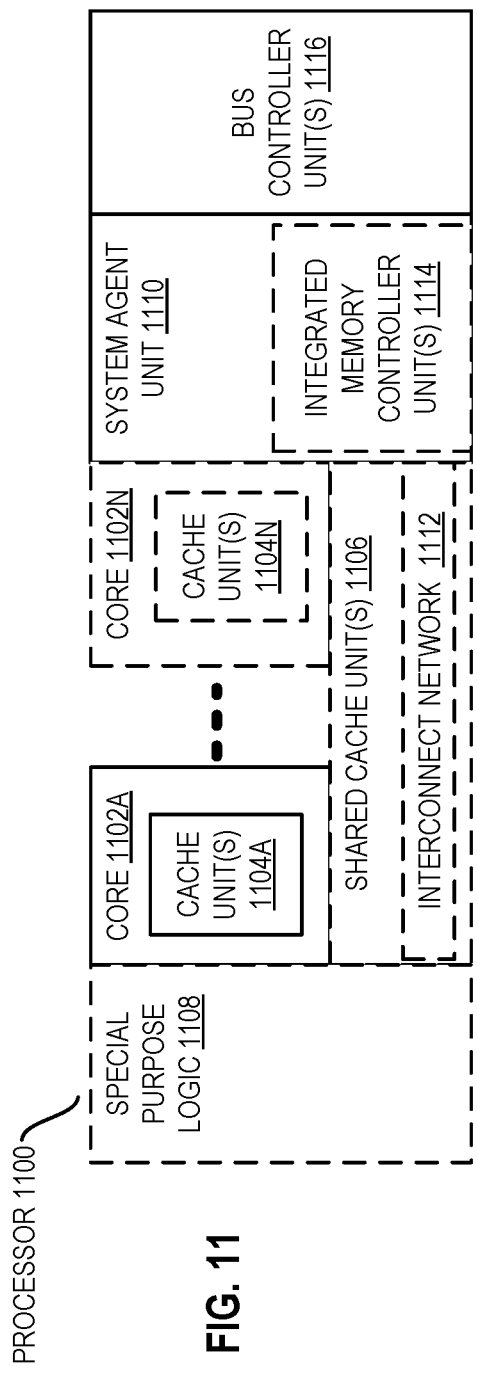
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108 (integrated graphics logic 1108 is an example of and is also referred to herein as special purpose logic), the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
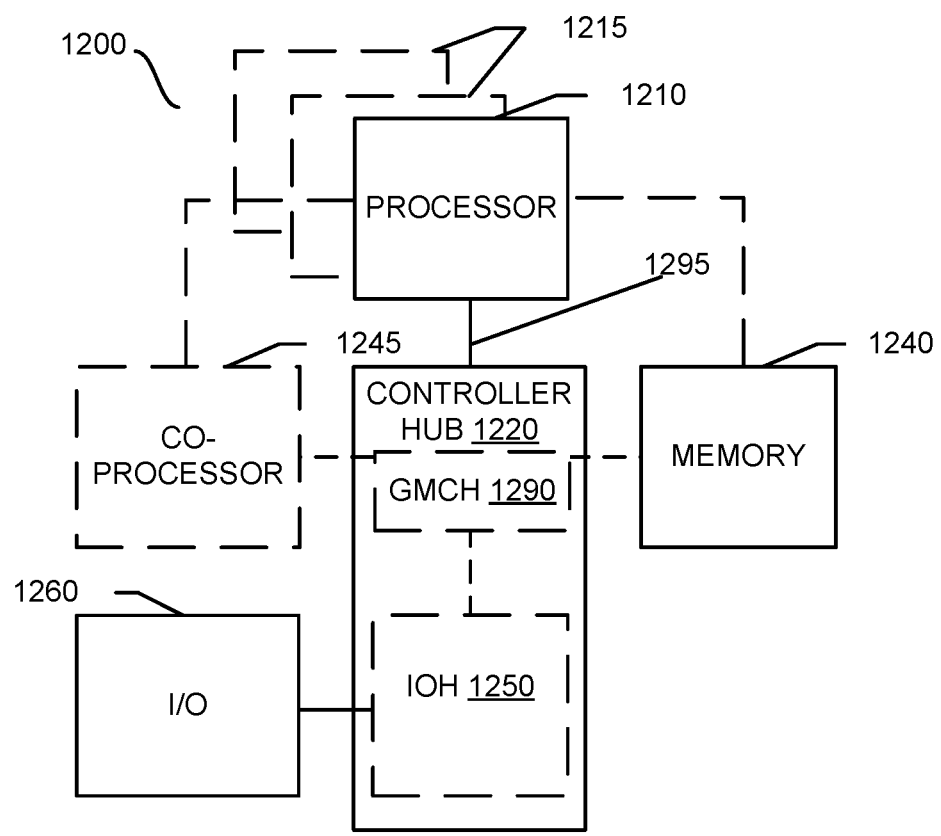
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
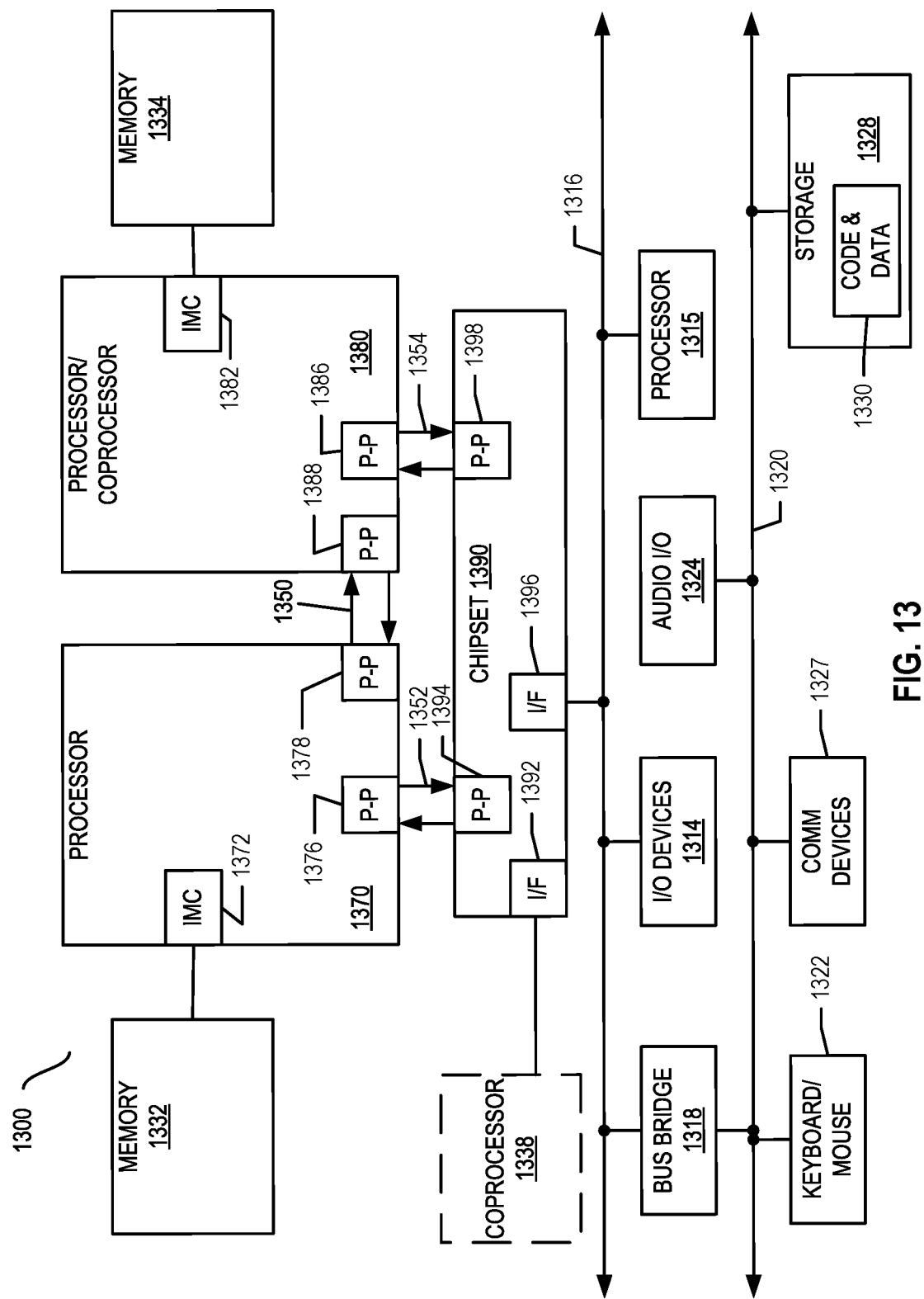

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
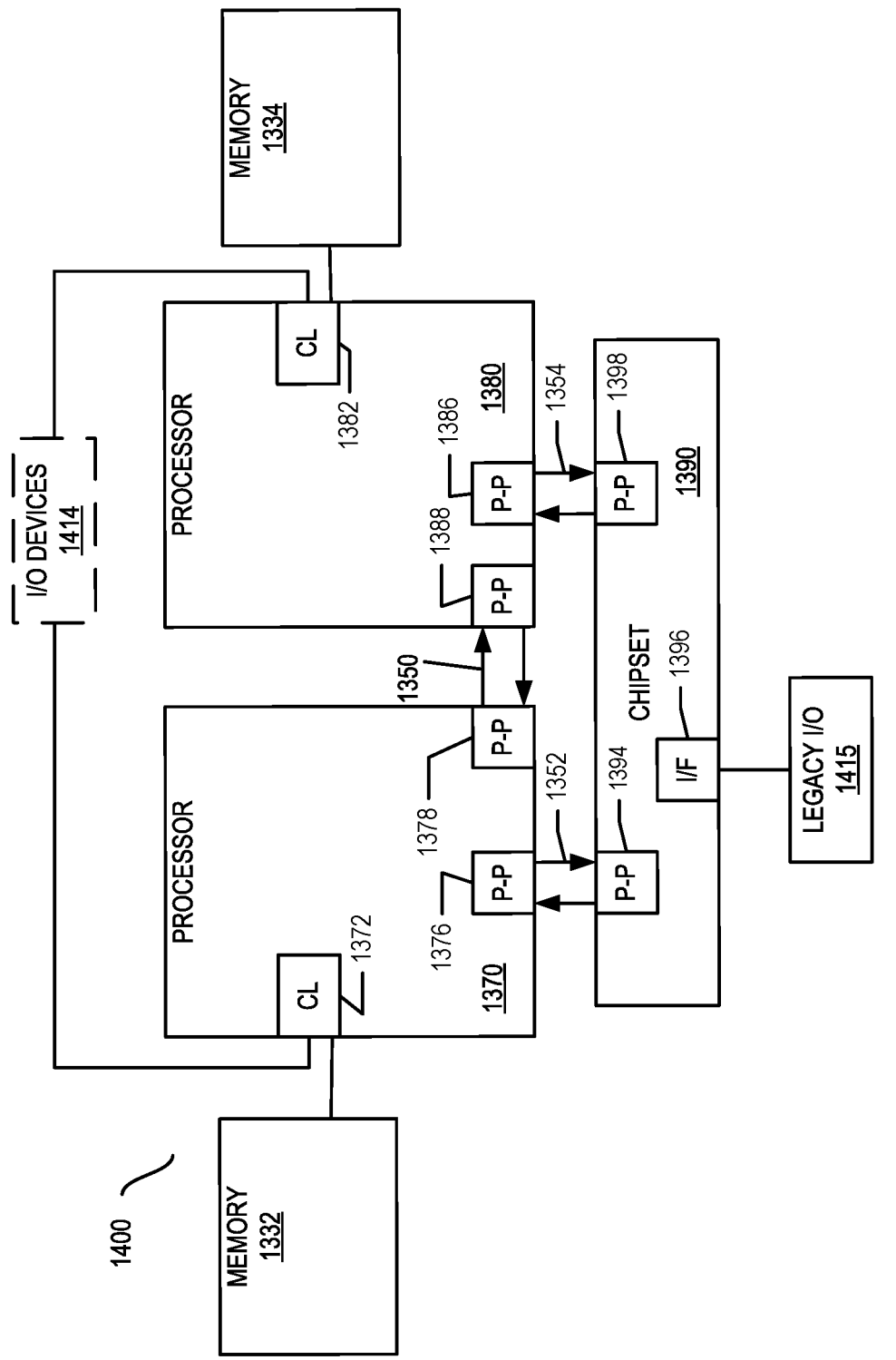

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
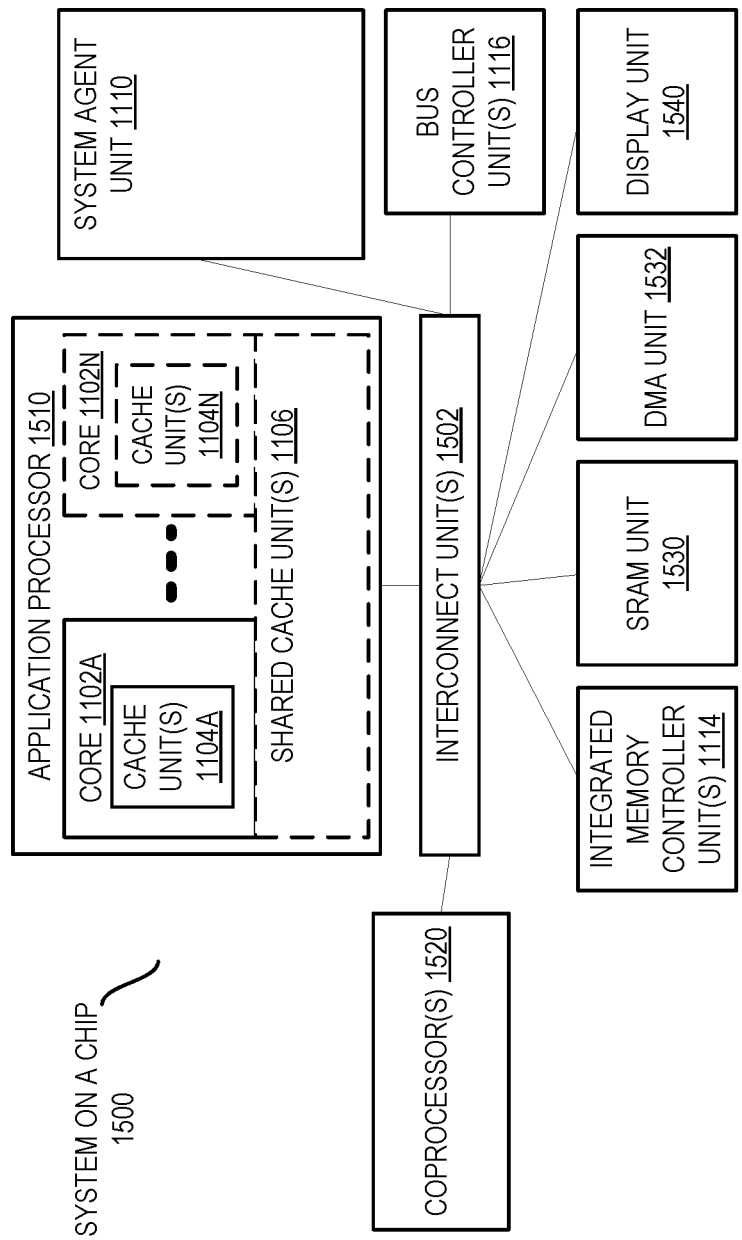

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, which include cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Further Examples

Example 1 provides a system used to execute an instruction, the system including: a memory, a processor including: a fetch circuit to fetch the instruction from the memory, the instruction including an opcode, a first destination identifier, an optional second destination identifier, and a source identifier to specify a source vector register, the source vector register including a plurality of single precision floating point data elements, a decode circuit to decode the fetched instruction, and an execution circuit to execute the decoded instruction to: convert the elements of the source vector register into double precision floating point values, store a first half of the double precision floating point values to a first location identified by the first destination identifier, and store a second half of the double precision floating point values to a second location identified by the second destination identifier.

Example 2 includes the substance of the system of Example 1, wherein the instruction does not include the optional second destination identifier, and wherein the execution circuit is to store the first half of the double precision floating point values into the first location identified by the first destination identifier, and to store the second half of the double precision floating point values into the source vector register.

Example 3 includes the substance of the system of Example 1, wherein the first location includes a first destination vector register of a register file, and the second location includes a second destination vector register of the register file.

Example 4 includes the substance of the system of Example 3, wherein the source vector register, the first destination vector register, and the second destination vector register are 512-bit vector registers.

Example 5 includes the substance of the system of any one of Examples 1-4, wherein the execution circuit is further to add each vector element of the first half of the double precision floating point values to data previously stored in the first location and to store a first sum to the first location, and to add each vector element of the second half of the double precision floating point values to data previously stored in the second location and to store a second sum to the second location.

Example 6 includes the substance of the system of any one of Examples 1-4, wherein the locations identified by the first destination identifier and the second destination identifier are in the memory.

Example 7 includes the substance of the system of Example 6, wherein the execution circuit is further to: perform a first atomic read-modify-write to read first data stored in the first location, add the first half of the double precision floating point values to the first data, and store double precision floating point sums to the first location, and perform a second atomic read-modify-write to read second data stored in the second location, add the second half of the double precision floating point values to the second data, and store double precision floating point sums to the second location.

Example 8 includes the substance of the system of any one of Examples 1-4, wherein the execution circuit is to convert all elements of the source vector register in parallel.

Example 9 includes the substance of the system of Example 1, wherein the opcode is to specify that only a lower half of the source vector register is to be converted and stored to the first location.

Example 10 includes the substance of the system of Example 1, wherein the opcode is to specify that only an upper half of the source vector register is to be converted and stored to the first location.

Example 11 provides a method of executing an instruction, the method including: fetching the instruction from a memory, the instruction including an opcode, a first destination identifier, an optional second destination identifier, and a source identifier to specify a source vector register including a plurality of single precision floating point data elements, decoding the fetched instruction by a decode circuit, and executing, by an execution circuit, the decoded instruction to: convert the elements of the source vector register into double precision floating point values, storing a first half of the double precision floating point values to a first location identified by the first destination identifier, and storing a second half of the double precision values to a second location identified by the second destination identifier.

Example 12 includes the substance of the method of Example 11, wherein the instruction does not include the optional second destination identifier, and wherein the execution circuit is to store the first half of the double precision floating point values into the first location, and to store the second half of the double precision floating point values into the source vector register.

Example 13 includes the substance of the method of Example 11, wherein the first location includes a first destination vector register of a register file and the second location includes a second destination vector register of the register file.

Example 14 includes the substance of the method of Example 13, wherein the source vector register, the first destination vector register, and the second destination vector register are 512-bit vector registers.

Example 15 includes the substance of the method of Example 11, further including: adding, by the execution circuit, each of the first half of the double precision floating point values to data previously stored in the first location, and adding each of the second half of the double precision floating point values to data previously stored in the second location.

Example 16 includes the substance of the method of Example 11, wherein the locations identified by the first destination identifier and the second destination identifier are in the memory.

Example 17 includes the substance of the method of any one of Examples 11-16, further including accumulating results in the first location and the second location by: performing a first atomic read-modify-write to read first data stored in the first location, add the first half of the double precision floating point values to the first data, and store double precision floating point results to the first location, and performing a second atomic read-modify-write to read second data stored in the second location, add the second half of the double precision floating point values to the second data, and store double precision floating point results to the second location.

Example 18 provides an apparatus for executing an instruction, the apparatus including: means for fetching an instruction, the means for fetching to fetch the instruction from a memory, the instruction including an opcode, a first destination identifier, an optional second destination identifier, and a source identifier to specify a source vector register, the source vector register including a plurality of single precision floating point data elements, means for decoding to decode the fetched instruction, and means for executing to execute the decoded instruction to: convert the elements of the source vector register into double precision floating point values, store a first half of the double precision floating point values to a first location identified by the first destination identifier, and store a second half of the double precision floating point values to a second location identified by the second destination identifier.

Example 19 includes the substance of the apparatus of Example 18, wherein the instruction does not include the optional second destination identifier, and wherein the execution circuit is to store the first half of the double precision floating point values into the first location, and to store the second half of the double precision floating point values into the source vector register.

Example 20 includes the substance of the apparatus of Example 18, wherein the first location includes a first destination vector register of a register file and the second location includes a second destination vector register of the register file.

Example 21 provides a processor for executing an instruction, the processor including: a fetch circuit to fetch the instruction from a memory, the instruction including an opcode, a first destination identifier, an optional second destination identifier, and a source identifier to specify a source vector register, the source vector register including a plurality of single precision floating point data elements, a decode circuit to decode the fetched instruction, and an execution circuit to execute the decoded instruction to: convert the elements of the source vector register into double precision floating point values, store a first half of the double precision floating point values to a first location identified by the first destination identifier, and store a second half of the double precision floating point values to a second location identified by the second destination identifier.

Example 22 includes the substance of the processor of Example 21, wherein the instruction does not include the optional second destination identifier, and wherein the execution circuit is to store the first half of the double precision floating point values into the first location, and to store the second half of the double precision floating point values into the source vector register.

Example 23 includes the substance of the processor of Example 21, wherein the first location includes a first destination vector register of a register file and the second location includes a second destination vector register of the register file.

Example 24 includes the substance of the processor of Example 23, wherein the source vector register, the first destination vector register, and the second destination vector register are 512-bit vector registers.

Example 25 includes the substance of the processor of any one of Examples 21-24, wherein the execution circuit is further to add each of the first half of the double precision floating point values to data previously stored in the first location, and to add each of the second half of the double precision floating point values to data previously stored in the second location.

Example 26 includes the substance of the processor of any one of Examples 21-22, wherein the locations identified by the first destination identifier and the second destination identifier are in the memory.

Example 27 includes the substance of the processor of Example 26, wherein the execution circuit is further to: perform an atomic read-modify-write to read first data stored in the first location, add the first half of the double precision floating point values to the first data, and store double precision floating point sums to the first location, and perform an atomic read-modify-write to read second data stored in the second location, add the second half of the double precision floating point values to the second data, and store double precision floating point sums to the second location.

Example 28 includes the substance of the processor of any one of Examples 21-24, wherein the execution circuit is to convert all elements of the source vector register in parallel.

Example 29 includes the substance of the processor of Example 21, wherein the opcode is to specify that only a lower half of the source vector register is to be converted and stored to the first location.

Example 30 includes the substance of the processor of Example 21, wherein the opcode is to specify that only an upper half of the source vector register is to be converted and stored to the first location.

Example 31 provides an apparatus for executing an instruction, the apparatus including: means for fetching an instruction, the means for fetching to fetch the instruction from a memory, the instruction including an opcode, a first destination identifier, an optional second destination identifier, and a source identifier to specify a source vector register, the source vector register including a plurality of single precision floating point data elements, means for decoding to decode the fetched instruction, and means for executing to execute the decoded instruction to: convert the elements of the source vector register into double precision floating point values, store a first half of the double precision floating point values to a first location identified by the first destination identifier, and store a second half of the double precision floating point values to a second location identified by the second destination identifier.

Example 32 includes the substance of the apparatus of Example 31, wherein the instruction does not include the optional second destination identifier, and wherein the execution circuit is to store the first half of the double precision floating point values into the first location, and to store the second half of the double precision floating point values into the source vector register.

Example 33 includes the substance of the apparatus of Example 32, wherein the first location includes a first destination vector register of a register file and the second location includes a second destination vector register of the register file.

Example 34 includes the substance of the apparatus of Example 33, wherein the source vector register, the first destination vector register, and the second destination vector register are 512-bit vector registers.

Example 35 includes the substance of the apparatus of any one of Examples 31-34, wherein the execution circuit is further to add each of the first half of the double precision floating point values to data previously stored in the first location, and to add each of the second half of the double precision floating point values to data previously stored in the second location.

Example 36 includes the substance of the apparatus of any one of Examples Example 31-32, wherein the locations identified by the first destination identifier and the second destination identifier are in the memory.

Example 37 includes the substance of the apparatus of any one of Examples 31-32, wherein the execution circuit is further to: perform an atomic read-modify-write to read first data stored in the first location, add the first half of the double precision floating point values to the first data, and store double precision floating point sums to the first location, and perform an atomic read-modify-write to read second data stored in the second location, add the second half of the double precision floating point values to the second data, and store double precision floating point sums to the second location.

Example 38 includes the substance of the apparatus of any one of Examples 31-32, wherein the execution circuit is to convert all elements of the source vector register in parallel.

Example 39 includes the substance of the apparatus of any one of Examples 31-32, wherein the opcode is to specify that only a lower half of the source vector register is to be converted and stored to the first location.

Example 40 includes the substance of the apparatus of any one of Examples 31-32, wherein the opcode is to specify that only an upper half of the source vector register is to be converted and stored to the first location.

Example 41 provides a non-transitory computer readable medium containing instructions that, when executed by a processor, cause the processor to perform a method of executing an instruction, the method including: fetching the instruction from a memory, the instruction including an opcode, a first destination identifier, an optional second destination identifier, and a source identifier to specify a source vector register including a plurality of single precision floating point data elements, decoding the fetched instruction by a decode circuit, and executing, by an execution circuit, the decoded instruction to: convert the elements of the source vector register into double precision floating point values, storing a first half of the double precision floating point values to a first location identified by the first destination identifier, and storing a second half of the double precision values to a second location identified by the second destination identifier.

Example 42 includes the substance of the non-transitory computer readable medium of Example 41, wherein the instruction does not include the optional second destination identifier, and wherein the execution circuit is to store the first half of the double precision floating point values into the first locations, and to store the second half of the double precision floating point values into the source vector register.

Example 43 includes the substance of the non-transitory computer readable medium of Example 41, wherein the first location includes a first destination vector register of a register file and the second location includes a second destination vector register of the register file.

Example 44 includes the substance of the non-transitory computer readable medium of Example 43, wherein the source vector register, the first destination vector register, and the second destination vector register are 512-bit vector registers.

Example 45 includes the substance of the non-transitory computer readable medium of any one of Examples 41-44, further including: adding, by the execution circuit, each of the first half of the double precision floating point values to data previously stored in the first location, and adding each of the second half of the double precision floating point values to data previously stored in the second location.

Example 46 includes the substance of the non-transitory computer readable medium of any one of Examples 41-42, wherein the locations identified by the first destination identifier and the second destination identifier are in the memory.

Example 47 includes the substance of the non-transitory computer readable medium of any one of Examples 41-44, further including accumulating results in the locations identified by the first destination identifier and the second destination identifier by: performing an atomic read-modify-write to read first data stored in the first location, add the first plurality of double precision floating point values to the first data, and store double precision floating point results to the first location, and performing an atomic read-modify-write to read second data stored in the second location, add the second plurality of double precision floating point values to the second data, and store double precision floating point results to the second location.

What is claimed is:

1. A system comprising a memory and a processor comprising:
    a fetch circuit to fetch an instruction having fields to specify an opcode and locations of first destination, second destination, and source vectors;
    a decode circuit to decode the instruction; and
    an execution circuit to execute the instruction as per the opcode;
    wherein the opcode indicates the execution circuit is to convert the elements of the source vector into double-precision floating point values, and, for each of the converted elements, accumulate the element with a previous value of the corresponding destination element in memory by reading, modifying, and writing the destination element atomically; and
    wherein first and second halves of the converted elements correspond to the first and second destination vectors, respectively.

2. The system of claim 1, wherein the source, first destination, and second destination vectors each comprise 512 bits.

3. The system of claim 1, wherein the first and second destination vectors and the source vector each comprise 256 bits.

4. The system of claim 1,
wherein the first and second destinations are located in memory, and wherein the execution circuit, when executing the instruction as per the opcode, is to:
perform a first atomic read-modify-write by reading first data from the first destination, adding the first half of the double precision floating point values to the first data, and storing resulting double precision floating point sums to the first destination; and
perform a second atomic read-modify-write by reading second data from the second destination, adding the second half of the double precision floating point values to the second data, and storing resulting double precision floating point sums to the second destination.

5. The system of claim 1, wherein the execution circuit is to convert all elements of the source vector in parallel.

6. The system of claim 1, wherein the opcode is to specify that only a lower half of the source vector is to be converted and stored to the first destination vector.

7. The system of claim 1, wherein the opcode is to specify that only an upper half of the source vector is to be converted and stored to the first destination vector.

8. The system of claim 1, wherein the instruction further specifies one of a plurality of different data formats for the source vector elements, the plurality of different data formats including byte (1 byte), word (2 bytes), doubleword (4 bytes), quadword (8 bytes), half-precision floating-point (2 bytes), single-precision floating-point (4 bytes), double-precision floating-point (8 bytes), and quad-precision floating-point (16 bytes).

9. The system of claim 1, wherein the instruction further specifies a write mask having a bit corresponding to each of the first and second destination vectors, the bit to indicate whether the element is to be written to or is to be masked, and wherein the execution circuit is only to accumulate converted elements to unmasked elements of the first and second destination vectors.

10. The system of claim 9, wherein the instruction further specifies whether masked elements of the first and second destination vectors are to be zeroed or merged.

11. A method performed by a processor, the method comprising:
fetching, using a fetch circuit, an instruction having fields to specify an opcode and locations of first destination, second destination, and source vectors;
decoding, using a decode circuit, the instruction; and
executing, using execution circuitry, the instruction as per the opcode;
wherein the opcode indicates execution circuitry is to convert the elements of the source vector into double-precision floating point values, and, for each of the converted elements, accumulate the element with a previous value of the corresponding destination element in memory by reading, modifying, and writing the destination element atomically; and
wherein first and second halves of the converted elements correspond to the first and second destination vectors, respectively.

12. The method of claim 11, wherein the source, first destination, and second destination vectors each comprise 512 bits.

13. The method of claim 11, wherein the source, first destination, and second destination vectors each comprise 256 bits.

14. The method of claim 13, further comprising accumulating results in the first location and the second location by:
performing a first atomic read-modify-write by reading first data from the first destination, adding the first half of the double precision floating point values to the first data, and storing resulting double precision floating point sums to the first destination; and
performing a second atomic read-modify-write by reading second data from the second destination memory location, adding the second half of the double precision floating point values to the second data, and storing resulting double precision floating point sums to the second destination.

15. An apparatus for executing an instruction, the apparatus comprising:
means for fetching an instruction having fields to specify an opcode and locations of first destination, second destination, and source vectors;
means for decoding the instruction; and
means for executing the instruction as per the opcode;
wherein the opcode indicates the execution circuit is to convert the elements of the source vector into double-precision floating point values, and, for each of the converted elements, accumulate the element with a previous value of the corresponding destination element in memory by reading, modifying, and writing the destination element atomically; and
wherein first and second halves of the converted elements correspond to the first and second destination vectors, respectively.

\* \* \* \* \*